United States Patent
Hornbostel et al.

(10) Patent No.: US 10,610,858 B2
(45) Date of Patent: Apr. 7, 2020

(54) METAL ION EXTRACTION FROM BRINES

(71) Applicant: SRI International, Menlo Park, CA (US)

(72) Inventors: Marc Hornbostel, Palo Alto, CA (US); Susanna Ventura, Los Altos, CA (US); Srinivas Bhamidi, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/278,287

(22) Filed: Feb. 18, 2019

(65) Prior Publication Data

US 2019/0176142 A1    Jun. 13, 2019

Related U.S. Application Data

(63) Continuation of application No. PCT/US2017/047617, filed on Aug. 18, 2017.
(Continued)

(51) Int. Cl.
*B01J 39/20* (2006.01)
*B01J 20/32* (2006.01)
(Continued)

(52) U.S. Cl.
CPC ............ *B01J 39/20* (2013.01); *B01D 15/203* (2013.01); *B01D 15/361* (2013.01);
(Continued)

(58) Field of Classification Search
None
See application file for complete search history.

(56) References Cited

U.S. PATENT DOCUMENTS

| | | |
|---|---|---|
| 5,256,615 A | 10/1993 | Oomura et al. |
| 2011/0124492 A1* | 5/2011 | Loukine ............... B01J 35/0013 502/159 |

(Continued)

FOREIGN PATENT DOCUMENTS

| | | |
|---|---|---|
| CN | 103601862 | 2/2014 |
| KR | 20120065848 | 6/2012 |

OTHER PUBLICATIONS

Nguyen et al. (Journal of Hazardous Materials, 2010, 173, 462-467) (Year: 2010).*

(Continued)

*Primary Examiner* — Clare M Perrin
(74) *Attorney, Agent, or Firm* — Shumaker & Sieffert P.A.

(57) ABSTRACT

A material includes a porous particle that includes a metal ion imprinted polymer. The metal ion imprinted polymer is formed from a hydrophilic co-monomer, a metal containing polymerizable compound, and a cross-linking agent. The metal containing polymerizable compound includes at least one metal chelating ligand. The metal ion imprinted polymer includes a plurality of metal ion selective binding sites. A method includes flowing brine containing a metal ion through a reactor that includes the material. The method further includes discharging the brine from the reactor, contacting the porous particles with water, and pressurizing the reactor with carbon dioxide. The carbon dioxide reacts with the adsorbed metal ions to form a metal carbonate solution. The method further includes depressurizing the reactor to precipitate metal carbonate from the metal carbonate solution and discharging the metal carbonate solution from the reactor.

16 Claims, 10 Drawing Sheets

Related U.S. Application Data

(60) Provisional application No. 62/376,515, filed on Aug. 18, 2016, provisional application No. 62/406,135, filed on Oct. 10, 2016.

(51) Int. Cl.

| | |
|---|---|
| *B01J 20/06* | (2006.01) |
| *B01J 20/22* | (2006.01) |
| *B01J 20/28* | (2006.01) |
| *B01J 20/26* | (2006.01) |
| *B01J 20/30* | (2006.01) |
| *B01J 20/04* | (2006.01) |
| *B01J 20/34* | (2006.01) |
| *B01J 20/285* | (2006.01) |
| *B01J 39/05* | (2017.01) |
| *B01J 49/06* | (2017.01) |
| *B01J 49/53* | (2017.01) |
| *B01J 47/02* | (2017.01) |
| *C01D 15/08* | (2006.01) |
| *B01D 15/20* | (2006.01) |
| *B01D 15/36* | (2006.01) |
| *C22B 26/12* | (2006.01) |

(52) U.S. Cl.
CPC ............ *B01J 20/043* (2013.01); *B01J 20/06* (2013.01); *B01J 20/22* (2013.01); *B01J 20/267* (2013.01); *B01J 20/268* (2013.01); *B01J 20/2803* (2013.01); *B01J 20/285* (2013.01); *B01J 20/28007* (2013.01); *B01J 20/28045* (2013.01); *B01J 20/28057* (2013.01); *B01J 20/3064* (2013.01); *B01J 20/3085* (2013.01); *B01J 20/3204* (2013.01); *B01J 20/328* (2013.01); *B01J 20/3293* (2013.01); *B01J 20/3475* (2013.01); *B01J 39/05* (2017.01); *B01J 47/02* (2013.01); *B01J 49/06* (2017.01); *B01J 49/53* (2017.01); *C01D 15/08* (2013.01); *C22B 26/12* (2013.01)

(56) References Cited

U.S. PATENT DOCUMENTS

| | | | |
|---|---|---|---|
| 2012/0012530 A1* | 1/2012 | Murray | B01D 15/00 210/684 |
| 2013/0108527 A1* | 5/2013 | Uehara | C22B 3/02 423/179.5 |
| 2014/0210122 A1 | 7/2014 | Chung et al. | |
| 2014/0334997 A1* | 11/2014 | Ehren | C01D 15/08 423/179.5 |
| 2015/0231601 A1 | 8/2015 | Janke et al. | |
| 2019/0134607 A1 | 5/2019 | Hornbostel et al. | |

OTHER PUBLICATIONS

Araki et al. (Journal of Japan Ion Exchange Society, 2003, 14, 2-7; full document provided as published in Japanese as well as English Abstract, which is relied upon) (Year: 2003).*
Luo et al. (ACS Sustainable Chemistry & Engineering, 2015, 3, 460-467, and Supporting Material, pp. S1-S17) (Year: 2015).*
Luo et al. (Supporting Material for ACS Sustainable Chemistry & Engineering, 2015, 3, 460-467, pp. S1-S17) (Year: 2015).*
International Preliminary Report on Patentability from International Application No. PCT/US2017/047617, dated Feb. 28, 2019, 9 pp.
International Search Report and Written Opinion of International Application No. PCT/US2017/047617, dated Oct. 30, 2017, 11 pp.
"Difference Between Crystallization and Preciptation," https://www.differencebetween.com/difference-between-crystallization-and-vs-precipitation/, Dec. 3, 2011, 1 pp.
Partial supplementary European search report of European Application No. 17842216.8, dated Feb. 25, 2020, 15 pp.
Thomas et al., "Low Temperature Geothermal Mineral Recovery Program," 40th Workshop on Geothermal Reservoir Engineering, Jan. 2015, 10 pp.

* cited by examiner

[N-(4-Vinylbenzyl)imino]diacetic Acid

| Polymer | Li Methacrylate (mmol) | Trioctyl phosphine oxide (mmol) | 2-methacryloxy-ethylphosphonate (mmol) | vinyl phosphonic acid | 4-vinylbenzoyl-1,1,1-trifluoroacetonate Li complex | EGDMA (mmol) | Li exchange capacity (mg/g) | Lithium exchange capacity (meq/g) | Surface area (m²/g) | Li uptake (mg/g) from 400 ppm standard solution, pH 9 | Li uptake (meq/g) from 400 ppm standard solution, pH 9 | Contact time (hr) |
|---|---|---|---|---|---|---|---|---|---|---|---|---|
| 39 | 1 | | | | | 8 | 3.27 | 0.47 | n/d | 1.36 | 0.19 | 2 |
| 48 | 2 | 2 | | | | 16 | 3.4 | 0.49 | 265 | 0.64 | 0.09 | 2 |
| 2-1 | | | 1 | | 1 | 8 | 3.27 | 0.47 | 2.4 | 1.84 | 0.26 | 1 |
| 2-25 | 2 | | | 2 | | 10 | 6.65 | 0.96 | 244 | 1 | 0.14 | 1 |
| 2-33 | | | 1 | | 1 | 8 | 3.45 | 0.49 | n/d | 1.84 | 0.26 | 1 |

EGDMA: Ethylene Glycol Dimethacrylate

FIG. 9

| Polymer | VbIDA (mmol) | MnCl₂·4H₂O (mmol) | TBAH (mmol) | EDGMA (mmol) | MEP | Silica (g) | Mn exchange capacity (mg/g) | Mn exchange capacity (meq/g) | Surface area (m²/g) | Mn standard solution concentration (ppm) | Mn uptake (mg/g) | Mn uptake (meq/g) | pH | time (hr) |
|---|---|---|---|---|---|---|---|---|---|---|---|---|---|---|
| 87 | 4 | 2 | | 16 | | | 13.8 | 0.25 | <2 | 500 | 5 | 0.09 | 4.65 | 2 |
| 35 | 2 | 1 | 2 | 12 | | | 14.8 | 0.27 | 336 | 1500 | 4 | 0.07 | 4.65 | 2 |
| 5 | 2 | 1 | 2 | 6 | | | 31.3 | 0.57 | n/d | 500 | 3.12 | 0.06 | 4.65 | 2 |
| 11 | | 2.2 | | 8 | 4.1 | 1 | 16.9 | 0.31 | 178 | 500 | 11.48 | 0.21 | 4.65 | 2 |
| 11 | | 2.2 | | 8 | 4.1 | 1 | 16.9 | 0.30 | 178 | 500 | 5.28 | 0.1 | 6 | 2 |

FIG. 10

VBIDA: N-(4-vinylbenzyl)imino Acetic Acid
TBAH: Tetrabutylammonium Hydroxide
EGDMA: Ethylene Glycol Dimethacrylate
HEC: Hydroxyethylcellulose
DMSO: dimethylsulfoxide

METAL ION EXTRACTION FROM BRINES

This application is a continuation of PCT/US2017/0047617, filed Aug. 18, 2017, which claims the benefit of U.S. Provisional Application No. 62/376,515, filed Aug. 18, 2016, and U.S. Provisional Application No. 62/406,135, filed Oct. 10, 2016, the entire contents of which are incorporated by reference herein.

GOVERNMENT RIGHTS

This invention was made with Government support under grant number DOE DE-EE-0006747 awarded by the Department of Energy. The Government has certain rights in this invention.

TECHNICAL FIELD

The disclosure relates to metal ion extraction from brines.

BACKGROUND

Brines used for metal extraction are typically found in underground reservoirs ("salar brines") and contain high concentrations of dissolved salts. For example, extraction of lithium from salar brines is a common method of lithium production because of its favorable cost of extraction. Salar brine in Argentina, Chile, and Bolivia may contain up to 1500 ppm of lithium and high-grade lithium compounds can be processed at relatively low operation costs. However, lithium separation from salar brines is based on solar evaporation in ponds and requires multiple purification steps. To extract the metals from the brine, the brine is pumped to the surface and exposed to the atmosphere. As water evaporates, the concentration of metals salts in the brine increases. The concentrated brine may be treated with other chemicals to precipitate metal salts from the concentrated brine. This process of metal extraction takes a significant amount of time, is dependent on a relatively dry and stable atmosphere, and amplifies environmental degradation due to large amounts of salt left on the ground.

SUMMARY

In some examples, the disclosure describes a material that includes a porous particle that includes a metal ion imprinted polymer. The metal ion imprinted polymer is formed from a hydrophilic co-monomer, a metal containing polymerizable compound, and a cross-linking agent. The metal containing polymerizable compound includes at least one metal chelating ligand. The metal ion imprinted polymer includes a plurality of metal ion selective binding sites.

In another example, the disclosure describes a method that includes suspending an organic phase in a nonpolar solvent to form a prepolymer mixture. The organic phase includes a monomer premix, a porogen, and an initiator. The monomer premix includes a hydrophilic co-monomer, a metal containing polymerizable compound that includes at least one metal chelating ligand, and a cross-linking agent. The method further includes heating the prepolymer mixture to initiate polymerization of the monomer premix and form a metal containing polymer. The method further includes separating the metal containing polymer from the prepolymer mixture and applying an aqueous acid to the metal containing polymer to form a metal ion imprinted polymer.

In another example, the disclosure describes a system that includes a reactor. The reactor includes a reactor vessel, a brine inlet through which brine is introduced into the reactor vessel, a brine outlet through which brine is discharged from the reactor vessel, a water inlet through which water is introduced into the reactor vessel, a carbon dioxide, a metal carbonate solution outlet through which metal carbonate is discharged from the reactor vessel, and porous particles in the reactor vessel. The carbon dioxide inlet is configured to receive carbon dioxide from a carbon dioxide source and used to pressurize the reactor vessel and depressurize the reactor vessel. The porous particles include a metal ion imprinted polymer formed from a hydrophilic co-monomer, a cross-linking agent and a metal containing polymerizable compound that includes at least one metal chelating ligand. The metal ion imprinted polymer includes a plurality of metal ion selective binding sites.

In another example, the disclosure describes a method that includes flowing brine containing a metal ion through a reactor that includes porous particles to remove metal ions from the brine. The porous particles include a metal ion imprinted polymer formed from a hydrophilic co-monomer, a cross-linking agent, and a metal containing polymerizable compound that includes at least one metal chelating ligand. The metal ion imprinted polymer includes a plurality of metal ion selective binding sites. The method further includes discharging the brine from the reactor, contacting the porous particles with water, and pressurizing the reactor with carbon dioxide. The carbon dioxide reacts with the adsorbed metal ions to form a metal carbonate solution. The method further includes depressurizing the reactor to precipitate metal carbonate from the metal carbonate solution and discharging the metal carbonate solution from the reactor.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 9 is a table of the monomers, their relative amounts used in the preparation of lithium imprinted polymers, and their relative metal uptake properties.

FIG. 10 is a table of the monomers, their relative amounts used in the preparation of manganese imprinted polymers, and their relative metal uptake properties.

DETAILED DESCRIPTION

Figure 1A:
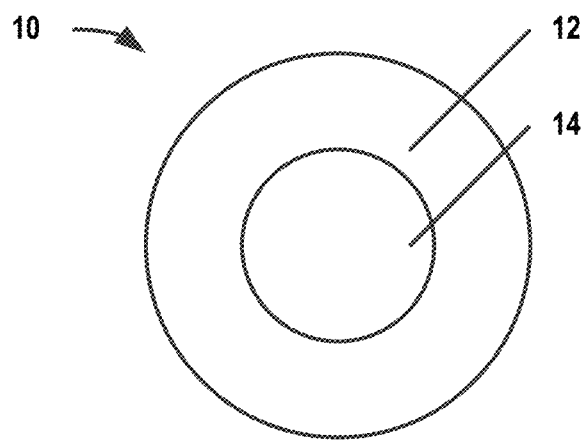
FIG. 1A is a conceptual diagram of a core/shell particle that includes a shell including a metal ion imprinted polymer and a core including an inorganic material.

The disclosure describes systems and techniques for selectively extracting metal ions from metal-containing liquid media, such as geothermal brine.

Geothermal brine is a waste fluid from geothermal power plants. Geothermal brines are produced by rock/water interactions and often contain significant amounts of metals and metals ions dissolved from the surrounding rock. Geothermal brines have complex chemical compositions that are determined by the composition of the rocks, chemical composition of the fluid, and the temperature and pressure during the fluid and rock/mass interaction. Geothermal heat sources are typically classified based on their available temperature of about 50° C. to 350° C. High-temperature (>200° C.) geothermal resources are typically found in volcanic regions and island chains, whereas the moderate-temperature (150-200° C.) and low-temperature (<150° C.) geothermal resources are usually widely found in most continental regions and are the most commonly available heat resources. Medium-to-low temperature geothermal brines generally have lower—but still significant—concentrations of metals (less than 5000 mg/L) as compared to hot geothermal brines, for which the total solids content can be more than 200,000 mg/L.

Geothermal brine may contain a variety of marketable metals, including silica, lithium, manganese, zinc, cesium, rubidium, boron, iron, and rare earth metals. Silica may be isolated first, followed by separation of metals by solvent extraction, ion-exchange resin separation, and precipitation. These metal separation processes often require large volumes of solvents and multiple steps. Metal separation processes based on conventional ion-exchange resins are not desirable because of their poor specificity for metal ion binding. Alkaline and alkaline earth ions such as $Na^+$, $Ca^{2+}$, and $Mg^{2+}$ are usually present in very high concentrations in geothermal brines, and they effectively compete with the binding of the metals of interest, reducing the resin-binding capacity and adding complexity to the separation process. Because of the difficult separation of the metal ions, the geothermal brine is typically reinjected into geothermal structures for further heat extraction without extraction of the dissolved metals or metal salts.

In accordance with examples of the disclosure, metal ions may be selectively extracted from liquid media using porous particles that include metal ion selective materials, such as metal ion imprinted polymers and inorganic metal ion sieves, or both. Metal ion selective materials may be formed by using metal ions as templates during polymerization and subsequently removing the metal ions. The resulting binding sites may selectively bind to target metal ions in the liquid media while substantially excluding undesired metal ions without any additional removal of the undesired metal ions. This may allow use of metal ion selective materials to remove selected metal ions without pre-treatment to remove other, undesired metal ions. Once metal ions have been extracted by the metal ion selective materials of the porous particles, pressurized carbon dioxide and water may be used to form carbonic acid in situ, rather than apply stronger or less environmentally safe acids to the porous particles. The carbonic acid may react with the extracted metal ions to form a metal carbonate or bicarbonate. Upon depressurization, the target metal ions may precipitate out of solution as metal carbonates, while more soluble undesired metal ions remain in solution. Precipitation of the target metal ions using carbon dioxide may also regenerate the metal ion selective materials, allowing reuse of the metal ion selective materials. In this way, the metal ion selective materials and relatively benign chemicals such as carbon dioxide may be extract selected metal ions from a solution in a manner that is relatively environmentally friendly and allows reuse of the metal ion selective materials.

In some examples, the metal ion selective materials, such as porous particles, described herein may be used to selectively extract lithium from geothermal brine containing high concentrations of other metal ions, such as potassium and sodium. The porous particles may include a lithium ion imprinted polymer. The lithium ion imprinted polymer may include, for example, a β-diketone functional group. In some examples, the porous particles may include a composite material, and may include a lithium ion imprinted polymer and an inorganic lithium ion sieve, such as a hydrous manganese oxide. The lithium ion imprinted polymer may include binding sites that chelate to lithium in the geothermal brine. The inorganic lithium ion sieve may include pores and vacant sites for ion exchange with lithium ions. Upon carbon dioxide pressurization and depressurization, lithium carbonate precipitates from solution as a purified, valuable product without further reaction.

Porous particles used for extraction of metal ions may be configured for use in a reactor. The porous particles may have a variety of shapes, sizes, and porosities that may be selected for particular flow conditions through a reactor bed of the porous particles. For example, in a reactor using the porous particles in a fixed bed, the porous particles may be sized to produce a pressure drop below a selected limit for the flow conditions. Factors influenced by size and shape of the porous particles may include, but are not limited to, porosity, surface area, metal ion transfer, metal ion binding kinetics, bed pressure drop, and the like. In some examples, a diameter of the porous particle may be between about 100 μm and about 3 mm. For example, the diameter of the porous particle may be between about 200 μm and about 400 μm. In some examples, a shape and size of the porous particles may be selected for a particular surface area per unit mass, as surface area may influence metal ion transfer and binding capacity. In some examples, a surface area per unit mass of the porous particle is greater than about 10 $m^2/g$. Shapes of the porous particles may include, but are not limited to, beads, needle-like particles, and the like.

Porous particles as described herein include a metal ion imprinted polymer. The metal ion imprinted polymer includes a plurality of metal ion selective binding sites. The metal ion selective binding sites may be configured with physical and chemical properties to selectively bind to a particular metal ion. The physical and chemical properties may include size, shape, and binding group arrangements of the binding sites that promote transfer of a target metal ion to the binding site and binding of the target metal ion with the binding site, while discouraging or blocking transfer of undesired metal ions to and binding with the particular binding site. Further, forming the polymer while the binding sites are bound to the selected metal ion may contribute to metal ion selectivity.

The metal ion imprinted polymer includes one or more ligands at the plurality of binding sites. The ligands are binding groups configured to bond to metal ions in the liquid media through chelation. Metal ion selectivity may be imparted by the affinity of the ligand for the imprinted metal ion and the size and shape of the generated cavities. The ligands may have an affinity for the target metal ion and may have a particular charge or coordination number that matches the target metal ion. The metal ion imprinted polymer may have a highly-crosslinked network of ligands that produces cavities having the particular size, shape, and/or binding site arrangement for selective binding of the particular metal ion. Ligands that may be used include, but are not limited to: polymerizable diketones, such as vinyl phenyl β-diketones; linear ethers having multiple ethylene dioxide units, such as poly(ethylene glycol) methyl ether methacrylate; cyclic ethers, such as methacryloyl oxymethyl-12-crown-4; polyamines or polyetheramides, such as poly(ethylene glycol) methyl ether methacrylamide derived from Jeffamine® monomamines, a product of Huntsman International LLC; N-(4-vinylbenzyl)imino diacetic acid; and the like.

Figure 12:
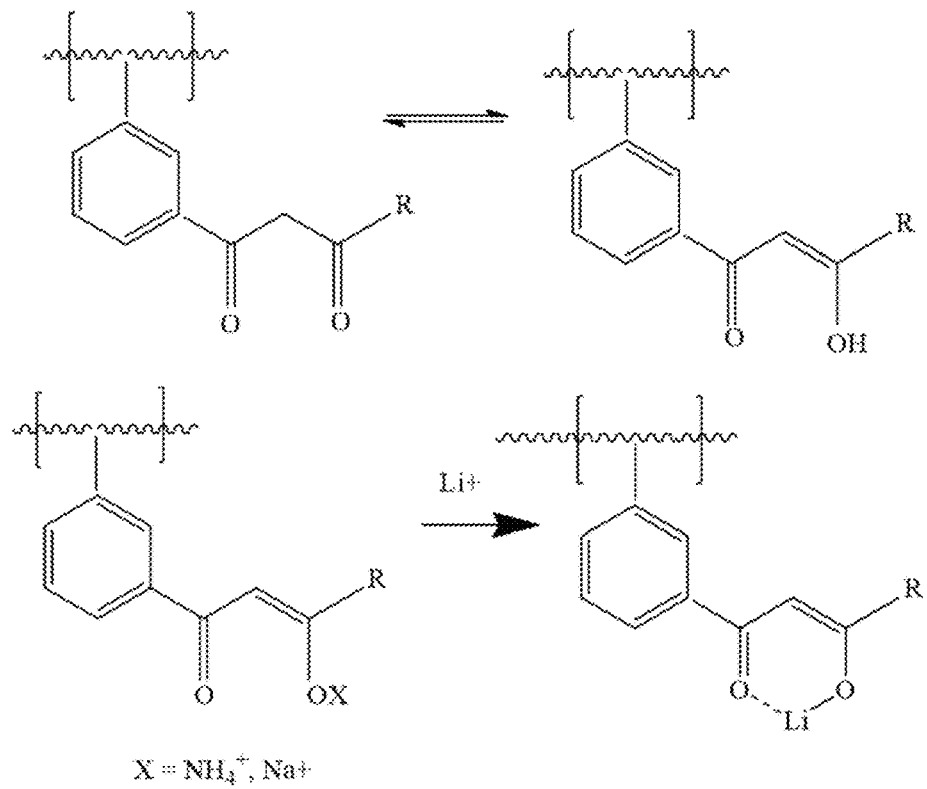
FIG. 12 is a diagram illustrating a chelation reaction between a diketone and a lithium ion.

In some examples, the ligand may be an alkyl chain having oxygen molecules at a 1,3 position, such as a β-diketone, such that the two oxygen molecules may form a coordination complex with the metal ion. FIG. 12 is a diagram illustrating a chelation reaction between a diketone and a lithium ion. Lithium ion uptake may occur through chelation of lithium ions by the enolic form of the diketone, as seen in FIG. 12. R may preferably have electron withdrawing properties to favor formation of the lithium enolate complex, such as in 1-(vinyl phenyl) 4,4',4"-trifluoro-1,3-butanedione.

The metal ion imprinted polymer may also have other co-polymers and functional groups that provide additional functionality to the metal ion imprinted polymer. For example, the metal ion imprinted polymer may be formed from a hydrophilic co-monomer that includes polar functional groups that provide some degree of hydrophilicity to the metal ion imprinted polymer, and which may aid in transfer of metal ions into the binding sites and to the ligands for bonding (chelation). For example, lithium ion imprinted polymers having hydrophilic functional groups may enhance kinetics of lithium sorption and desorption by assisting the transfer of a hydrated metal cation from an aqueous phase of the metal ion imprinted polymer.

Metal ions to be extracted by the metal ion imprinted polymers may include any metal ions that are soluble in water and capable of chelation to ligands of a metal ion imprinted polymers. Metal ions that may be extracted include, but are not limited to, alkali metals such as lithium, potassium, cesium, and rubidium; alkali earth metals such as magnesium; transition metals such as zinc, manganese, and rare earth metals; and the like.

In some examples, the porous particles may include a metal ion imprinted polymer bonded to a substrate. The substrate may provide improved structure and binding site accessibility of the metal ions to the metal ion imprinted polymer. FIG. 1A is a conceptual diagram of a core/shell porous particle 10 that includes a metal ion imprinted polymer shell 12 and an inorganic substrate core 14. The inorganic substrate core 14 may provide support and mechanical stability to the core/shell particle 10. The inorganic substrate core 14 may include functional groups configured to bond to the metal ion selective polymer 12. The size or shape of the inorganic substrate core may affect the surface area of the inorganic substrate core, which may affect the binding capacity of the metal ion imprinted polymer shell. For example, as the diameter of the inorganic substrate core decreases, the ratio of surface area to volume increases, which increases the number of binding sites for the metal ion imprinted polymer on the inorganic substrate core. Inorganic substrates that may be used include, but are not limited to, silica, graphite, and the like. In some examples, a composition of core/shell porous particle 10 includes a concentration of metal ion imprinted polymer greater than about 10 wt. % and less than about 90 wt. % and a concentration of inorganic substrate greater than about 10 wt. % and less than about 90 wt. %. For example, a wt. % ratio of metal ion imprinted polymer to inorganic substrate may be 70:30.

In some examples, the porous particles may contain a metal ion imprinted polymer and one or more additional metal ion selective materials. In some examples, an additional metal ion selective material may include an inorganic metal ion sieve for adsorbing metal ions from solution. Inorganic metal ion sieves may include porous structures and a high number of adsorptive vacant sites for adsorption of a particular metal ion. Metal ions may be adsorbed by the inorganic metal ion sieve through ion exchange. Inorganic metal ion sieves that may be used include, but are not limited to: hydrous manganese oxide, such as hydrous manganese oxide derived from $Li_{1.6}Mn_5O_{12}$, $Li_{1.6}Mn_{1.6}O_4$, or $LiMn_2O_4$; ferrous manganese oxide; aluminum hydroxide; titanium oxide; and the like.

Figure 1B:
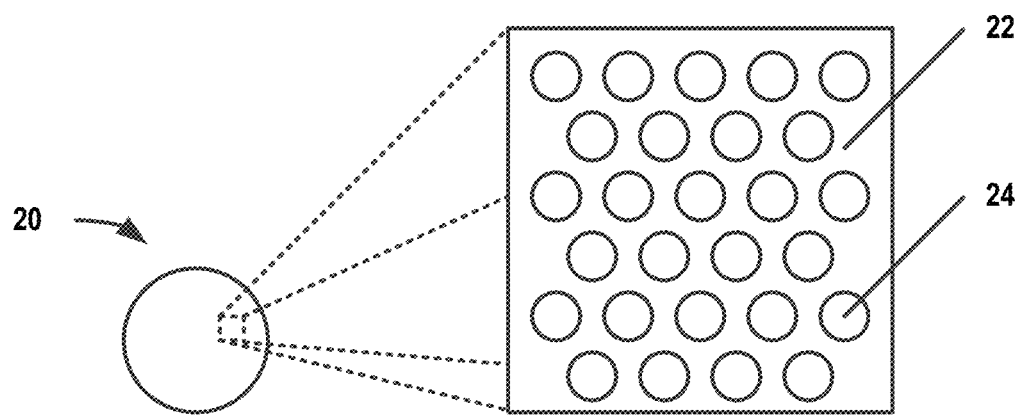
FIG. 1B is a conceptual diagram of a composite particle that includes a metal ion imprinted polymer and an inorganic metal ion sieve.

In some examples, the porous particles may be a composite of inorganic metal ion sieve particles dispersed in a metal ion imprinted polymer. These composite porous particles may act as high capacity selective composite sorbents for metal ions in brine solutions. FIG. 1B is a conceptual diagram of a composite porous particle 20 that includes inorganic metal ion sieve nanoparticles 24 dispersed in a metal ion imprinted polymer binder 22. The porous structure and selective adsorption capacity of metal ion imprinted polymer binder 22 may promote diffusion and adsorption of metal ions into the composite porous particle 20, while the inorganic metal ion sieve nanoparticles 24 may promote selective extraction and enhanced capacity of the metal ions by the composite porous particle 20. For example, manganese oxide nanoparticles formed from lithium templates, as described in FIG. 3 below, may have higher lithium selectivity and adsorption capacity than manganese oxide nanoparticles that are not formed from lithium templates.

Metal ion selective polymer binder 22 and inorganic metal sieve nanoparticles 24 may also have synergistic adsorption effects. For example, in composite porous particles having hydrous manganese oxide nanoparticles dispersed in lithium ion selective β-diketone polymer, the lithium ion selective β-diketone polymer may enhance the hydrous manganese oxide nanoparticle lithium uptake kinetics by enhancing lithium concentration at an interface of the hydrous manganese oxide nanoparticles and lithium ion selective β-diketone polymer. The composite particles may have any composition of metal ion imprinted polymer binder 22 and inorganic metal ion sieve nanoparticles 24. In some examples, a concentration of metal ion imprinted polymer is greater than about 10 wt. % and less than about 90 wt. % and a concentration of inorganic meta ion sieve is greater than 10 wt. % and less than about 90 wt. %. For example, a wt. % ratio of metal ion imprinted polymer to inorganic metal ion sieve may be 50:50, or 70:30, or 80:20.

Figure 2:
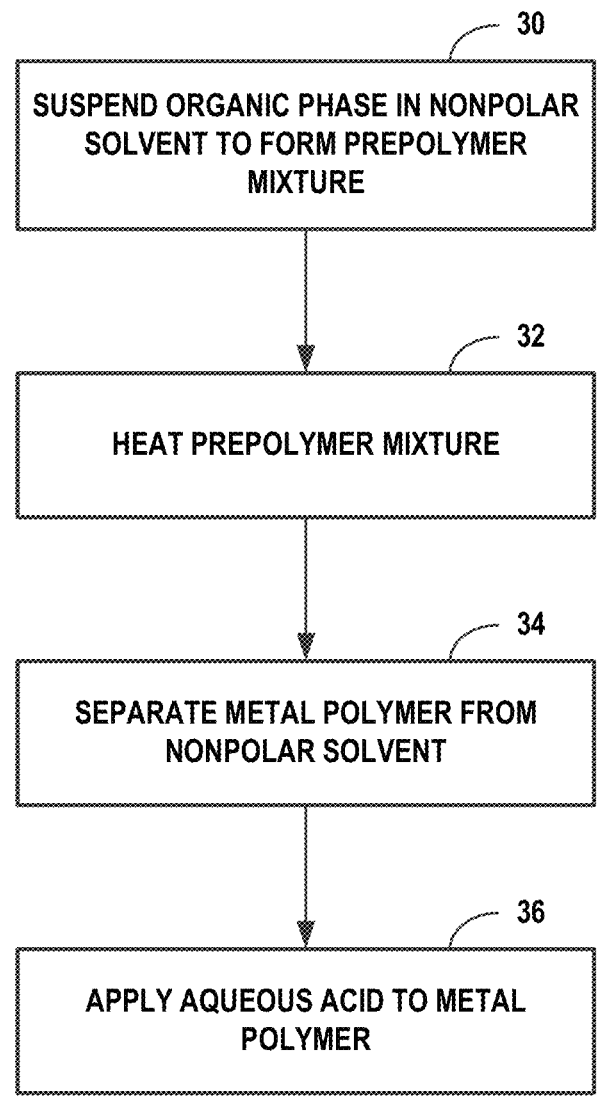
FIG. 2 is a flow diagram illustrating an example technique for manufacturing porous particles that include metal ion imprinted polymers.

FIG. 2 is a flow diagram illustrating an example technique for manufacturing porous particles that include metal ion imprinted polymers, as described herein. In some examples, the porous particles may be created by an inverse suspension polymerization method and a template metal ion removal method. The inverse suspension polymerization method may reduce migration of metal ions from the metal ion imprinted polymer while allowing for controlled size and shape of the resulting porous particles.

The technique of FIG. 2 includes suspending an organic phase in a nonpolar solvent to form a prepolymer mixture (30). The organic phase may include a monomer premix, a porogen, and an initiator. The monomer premix includes at least a metal containing polymerizable compound and a crosslinking agent. For example, the organic phase of a prepolymer mixture for forming a lithium ion imprinted diketone may include: a lithium chelating monomer such as a β-diketone, Li 1-(vinyl phenyl) 4,4',4"-trifluoro-1,3-butanedione (below); a cross-linking agent such as ethylene glycol dimethacrylate; a hydrophilic co-monomer such as 2-hydroxyethylmethacrylate; and a porogen such as dimethoxysulfoxide; and an initiator such as azobisisobutyronitrile.

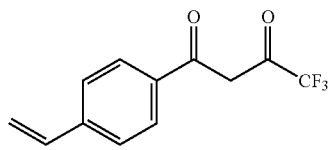 [SMILES: C=Cc1ccc(C(=O)CC(=O)C(F)(F)F)cc1]

The metal containing polymerizable compound includes at least one chelating ligand. The chelating ligand on the metal containing polymerizable compound may correspond to a ligand on the resulting metal ion imprinted polymer that is configured to bond to the target metal ion. The chelating ligand may be any organic group capable of bonding with the target metal ion. Chelating ligands that may be used include, but are not limited to, polymerizable diketones, such as vinyl phenyl β-diketones; linear ethers having multiple ethylene dioxide units, such as poly(ethylene glycol) methyl ether methacrylate; cyclic ethers, such as methacryloyl oxymethyl-12-crown-4; polyamines or polyetheramides, such as poly(ethylene glycol) methyl ether methacrylamide derived from Jeffamine® monomamines, a product of Huntsman International LLC; N-(4-vinylbenzyl) imino diacetic acid; and the like. In some examples, the chelating ligand may be an alkyl chain having oxygen molecules at a 1,3 position, such that the two oxygens may form a coordination complex with the target metal ion. For example, 1-(vinyl phenyl) 4,4',4"-trifluoro-1,3-butanedione includes a β-diketone that may chelate lithium ions. In some examples, the chelating ligand may be selected to form a metal ion enolate complex with the metal ion, such as a lithium ion enolate complex with lithium. The metal containing polymerizable compound may also include a polymerizable functional group configured to polymerize with other monomers in the monomer premix. The polymerizable functional group may be selected from a variety of functional groups capable of polymerization including saturated groups, unsaturated groups, and the like.

Figure 4:
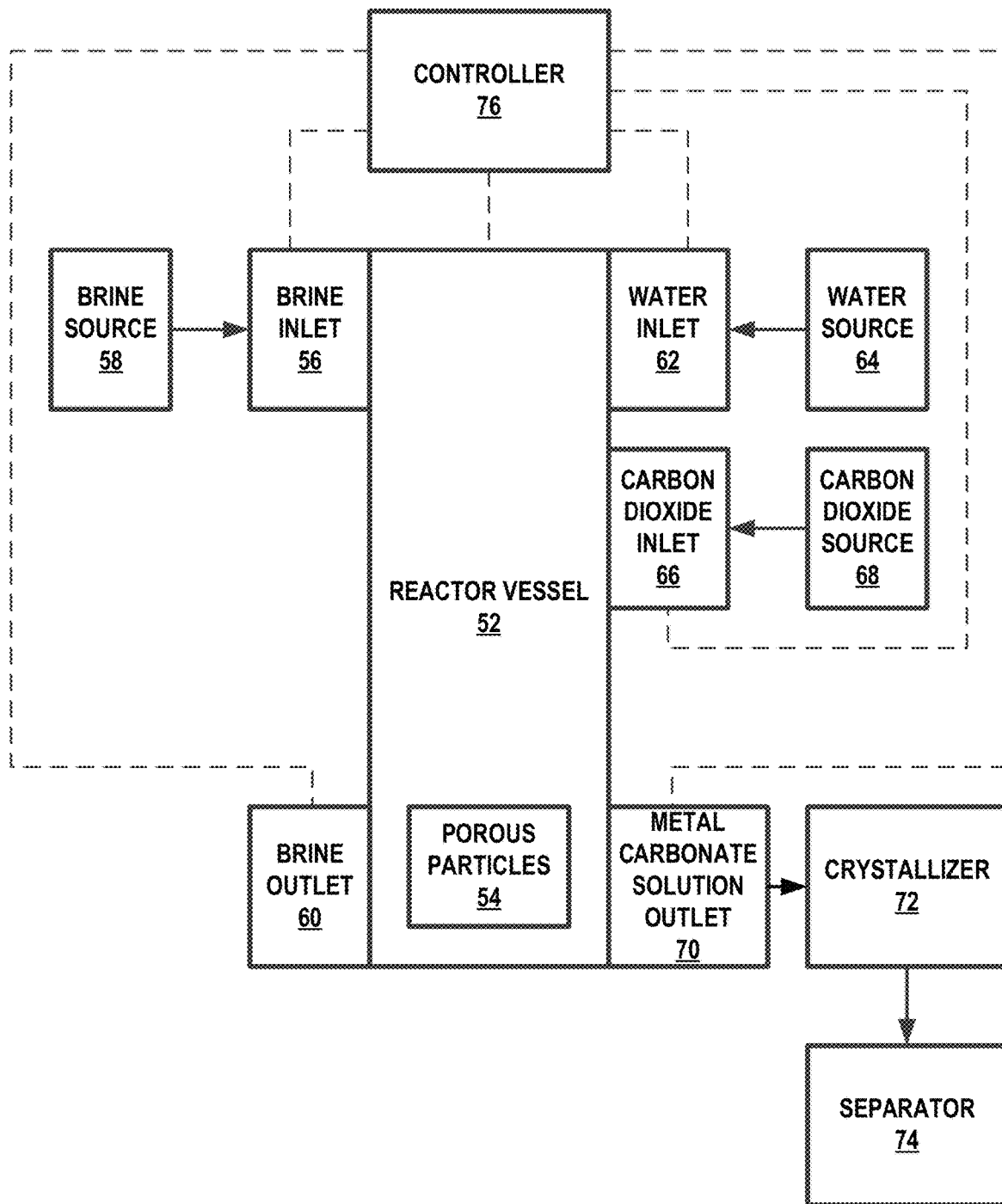
FIG. 4 is a conceptual and schematic block diagram illustrating an example system for extracting metal ions from metal-containing brines.
Figure 7A:
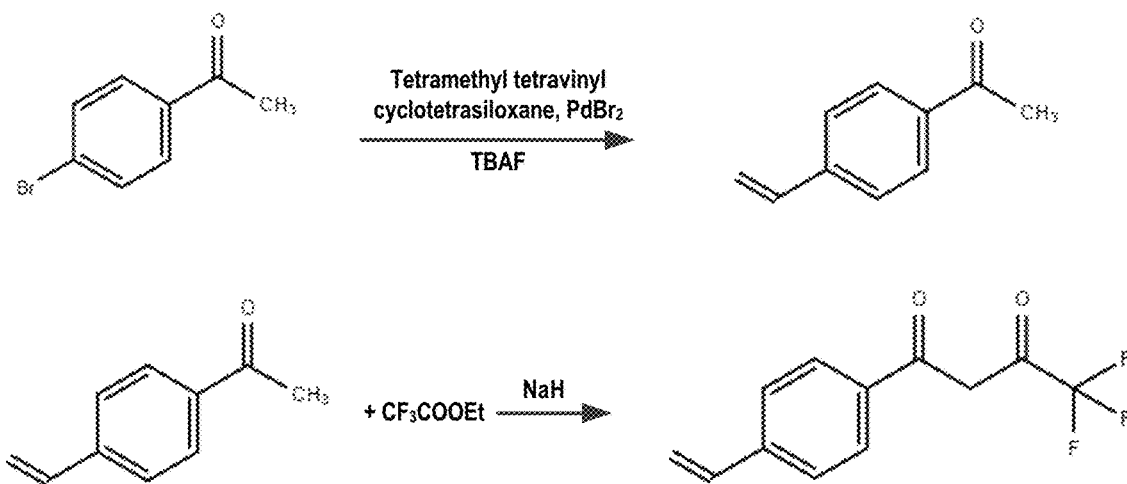
FIG. 7A is a diagram of a reaction mechanism for synthesis of 1-(vinyl phenyl) 4,4',4"-trifluoro-1,3-butanedione.

In some examples, the metal containing polymerizable compound may be synthesized. For example, FIG. 7A is a diagram of a reaction mechanism for synthesis of 1-(vinyl phenyl) 4,4',4"-trifluoro-1,3-butanedione. In the example of FIG. 7A, 4-bromoacetophenone is functionalized with an unsaturated functional group to form 4-vinylphenylacetophenone. A second carbonyl group is added to 4-vinylphenylacetophenone to form the diketone 1-(p-vinyl phenyl) 4,4',4"-trifluoro-1,3-butanedione.

In addition to the metal containing polymerizable compound, the monomer premix may also include other functional monomers to be polymerized with the metal containing polymerizable compound. The other functional monomers may include a functional group selected to polymerize with the metal containing polymerizable compound and other monomers in the monomer premix. The functional monomers may provide the resulting metal ion imprinted polymer with a variety of properties including, but not limited to, hydrophilicity, additional chelating ligands, and the like. In some examples, the monomer premix includes a hydrophilic co-monomer selected to provide some degree of hydrophilicity to the metal ion imprinted polymer. For example, 1-(p-vinyl phenyl) 4,4',4"-trifluoro-1,3-butanedione may be reacted with a hydrophilic co-monomer, such as 2-hydroxyethylmethacrylate, that provides the resulting metal ion imprinted polymer with polar functional groups that provide some degree of hydrophilicity to the metal ion imprinted polymer. Functional monomers that may be used include, but are not limited to, 2-methacryloxyethylphosphate, lithium methacrylate, 2-hydroethylmethacrylate, and the like.

The crosslinking agent may be selected to crosslink the metal containing polymerizable compounds into a substantially stable and porous metal ion imprinted polymer. The crosslinking agent may generate the rigidity within the metal ion imprinted polymer to preserve the configuration and binding site arrangement of the at least one chelating ligand after a metal ion is removed from the metal ion imprinted polymer. Additionally or alternatively, the crosslinking agent may increase surface area and porosity of the metal ion imprinted polymer. A variety of crosslinking agents may be used including, but not limited to, ethylene glycol dimethacrylate (EGDMA), pentaerythritol triacrylate, pentaerythritol tetraacrylate, trimethylolpropane triacrylate, N,N'-methylenebis(acrylamide), 1,4-divinylbenzene, and the like. In some examples, an excess of crosslinking agent may be used in the monomer premix.

The organic phase may include a porogen selected to create or increase porosity in the metal ion imprinted polymer and facilitate polymerization of the metal containing polymerizable compound by dissolving monomers of the monomer premix. Increased porosity and, correspondingly, surface area of the metal ion imprinted polymer may allow better access of the metal ions to binding sites of the ligands. A variety of porogens may be used including, but not limited to, dimethylsulfoxide (DMSO), dimethylformamide (DMF), and the like. The organic phase may include an initiator selected to start or increase a rate of polymerization. A variety of initiators may be used including, but not limited to, azobisisobutyronitrile (AIBN), benzyl peroxide, and the like.

The organic phase may be suspended in a nonpolar solvent. The nonpolar solvent may be selected to reduce migration of metal ions out of the metal ion imprinted polymer, as compared to polar solvents. A variety of nonpolar solvents may be used including, but not limited to, mineral oil, and the like. The organic phase may be suspended through agitation of the organic phase in the nonpolar solvent, such as through mixing or stirring. For example, a monomer premix including 1-(p-vinyl phenyl)-4,4',4''-trifluoro-1,3-butanedione, ethylene glycol methacrylate, and 2-hydroxyethylmethacrylate; a porogen including dimethylsulfoxide; and an initiator including azobisisobutyronitrile; may be added to a nonpolar solvent, such as mineral oil, and mixed to form a prepolymer mixture in the form of dispersed, suspended micelles in the nonpolar solvent.

The technique of FIG. 2 further includes heating the prepolymer mixture to initiate polymerization of the monomer premix to form a metal containing polymer (34). As the temperature of the prepolymer mixture increases, the components of the prepolymer mix, such as the metal containing polymerizable compound, the crosslinking agent, and any functional co-monomers, may polymerize to form a metal containing polymer. For example, unsaturated groups on Li 1-(p-vinyl phenyl)-4,4',4''-trifluoro-1,3-butanedione, ethylene glycol methacrylate, and 2-hydroxyethylmethacrylate may bond to form a crosslinked polymer having a lithium chelated to a β-diketone. The metal containing polymer may include a complex formed between the metal ion of the metal containing polymer and the ligand of the metal containing monomer. In some examples, temperature and time of heating may be controlled for selected particle sizes. For example, higher polymerization temperatures and/or shorter polymerization time may lead to smaller diameter particles, while lower polymerization temperatures and/or longer polymerization time may lead to larger diameter particles.

The technique of FIG. 2 further includes separating the metal containing polymer from the nonpolar solvent (36). In some examples, the metal containing polymer may be filtered and washed to remove unreacted monomers. Separation processes may include, but are not limited to, filtration, washing, drying, and the like. The technique of FIG. 2 further includes applying an aqueous acid to the metal containing polymer to form the metal ion imprinted polymer (38). The aqueous acid may replace the metal ion with one or more hydrogen ions to remove the metal ions from the metal containing polymer and result in the metal ion imprinted polymer. For example, crosslinked polymers having a lithium chelated to a β-diketone may be treated with HCl to replace the lithium with a hydrogen to form a lithium ion imprinted β-diketone polymer.

As further illustrated below, during polymerization, as binding sites are generated from the self-assembly of ligands around the template metal ion (M) and subsequently crosslinked, the binding site arrangement enables the binding sites to match the charge, size, and coordination number of the metal ion. Furthermore, the geometry of the binding sites is preserved through the crosslinking and metal ion leaching steps to generate a favorable environment for the particular metal ion to rebind.

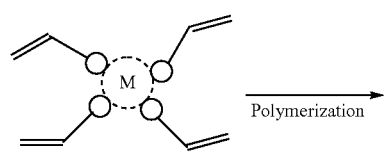

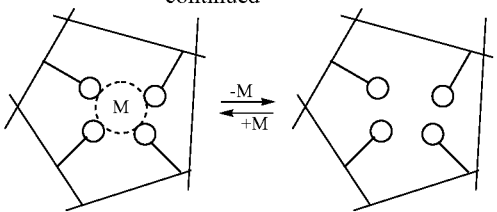

Figure 3:
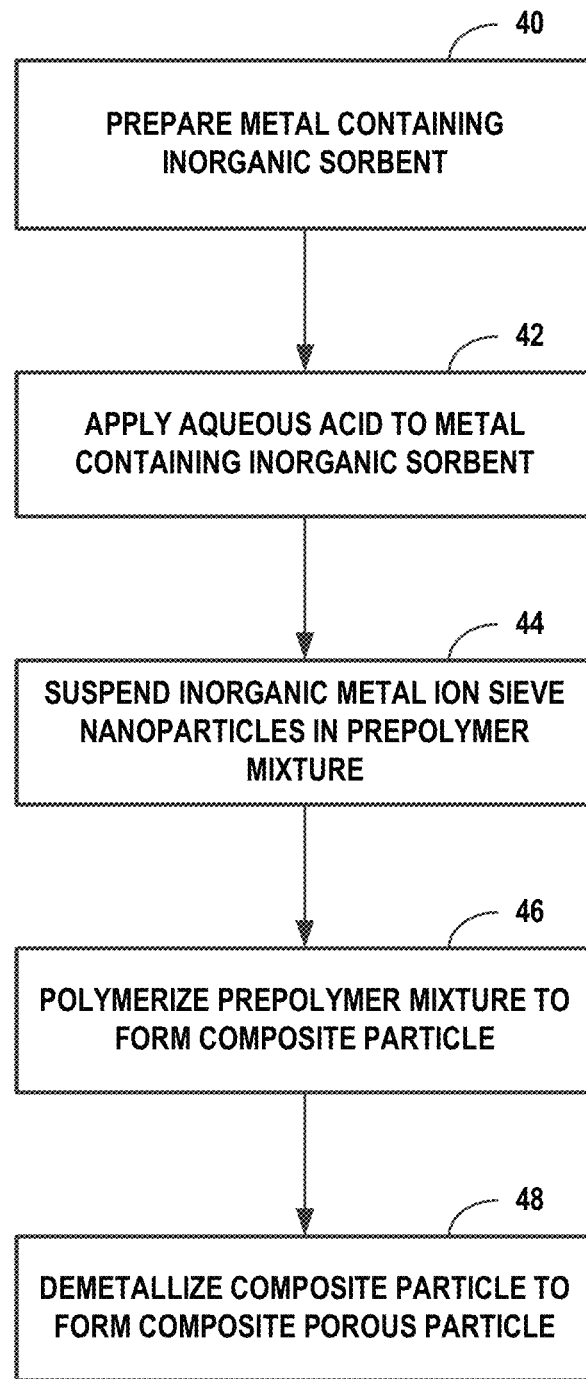
FIG. 3 is a flow diagram illustrating an example technique for manufacturing composite porous particles that include metal ion imprinted polymers and inorganic metal ion sieve nanoparticles, as described herein.

In some examples, the technique of FIG. 2 may be modified to manufacture composite porous particles, such as composite porous particle 20 of FIG. 1B. FIG. 3 is a flow diagram illustrating an example technique for manufacturing composite porous particles that include metal ion imprinted polymers and inorganic metal ion sieve nanoparticles, as described herein.

The technique of FIG. 3 includes preparing a metal containing inorganic sorbent (40). Metal containing inorganic sorbents may be prepared using a variety of methods including, but not limited to, solid state reactions, hydrothermal reactions, sol-gel reactions, and the like. In some examples, the metal containing inorganic sorbent may be formed using a metal ion template. For example, preparation of a metal containing inorganic sorbent through hydrothermal reaction may involve synthesizing inorganic sorbent nanoparticles, synthesizing a metal containing inorganic sorbent precursor, and calcinating the inorganic sorbent nanoparticles and the metal containing inorganic sorbent precursor. For example, lithiated manganese oxide nanoparticles may be formed from calcination of manganese oxide nanoparticles and lithium-manganese-oxygen precursors, as will be explained in the examples. The resulting metal containing inorganic sorbent may be in the form of nanoparticles. Nanoparticles of metal containing inorganic sorbents may have a higher intraparticle diffusion rate of metal ions than larger inorganic sorbent particles. In some examples, particle size of the inorganic sorbent particles may be controlled by calcination at a lower temperature, such as less than 50° C. In some examples, the inorganic metal ion sieve nanoparticles formed from the metal containing inorganic sorbent nanoparticles may have a maximum dimension, such as a length, width, height, or diameter, of greater than about 10 nm and less than about 1000 nm.

The technique of FIG. 3 may include applying an aqueous acid to the metal containing inorganic sorbent nanoparticles to extract metal ions from the metal containing inorganic sorbent and form inorganic metal ion sieve nanoparticles (42). The metal ions in the metal containing inorganic sorbent nanoparticles may be replaced by hydrogen atoms. The inorganic metal ion sieve nanoparticles may retain a structure of the metal containing inorganic sorbent nanoparticles, but may be characterized by pore structures and vacant binding sites that are selective to the extracted metal ions through ion exchange. For example, lithium manganese oxide nanoparticles, such as $Li_{1.6}Mn_5O_{12}$, $Li_{1.6}Mn_{1.6}O_4$, or $LiMn_2O_4$, may be used as metal containing inorganic sorbent nanoparticles. Lithium ions may be extracted by application of hydrochloric acid to form hydrous manganese oxide nanoparticles as inorganic lithium ion sieve nanoparticles. The resulting binding sites in the inorganic lithium ion sieve nanoparticles may be selective to lithium ions through ion exchange, while blocking other metal ions such as potassium and calcium.

The technique of FIG. 3 may include suspending the inorganic metal ion sieve nanoparticles in a prepolymer mixture, such as the prepolymer mixture of step 30 of FIG. 2 (44). Suspending the inorganic metal ion sieve nanoparticles may include stirring the inorganic metal ion sieve nanoparticles to maintain the nanoparticles in suspension. For example, the hydrous manganese oxide nanoparticles described above may be suspended in a prepolymer mixture of a β-diketone, a hydrophilic co-monomer, a crosslinking agent, a porogen, and an initiator.

The technique of FIG. 3 may include polymerizing the prepolymer mixture that includes the inorganic metal ion sieve nanoparticles to form a composite particle that includes inorganic metal ion sieve nanoparticles in a metal containing polymer binder (46). In some examples, polymerizing the prepolymer mixture may include steps 32 and 34 of FIG. 2. During polymerization of the prepolymer mixture, the metal ion polymer may form throughout the inorganic metal ion sieve particles to bind the inorganic metal ion sieve particles into a composite. For example, the hydrous manganese oxide nanoparticles described above may form a composite with a lithium polymer that includes β-diketone ligands bonded to the lithium.

The technique of FIG. 3 may include demetallizing the composite particles to form composite porous particles that includes inorganic metal ion sieve nanoparticles in a metal ion imprinted polymer binder (48). The composite particles may be demetallized by application of an aqueous acid to the composite particles, which may replace the metal ions with hydrogen. The resulting composite porous particles may have inorganic metal ion sieve nanoparticles dispersed throughout the metal ion imprinted polymer.

The porous particles described herein may be used to extract metal ions from metal containing brines. FIG. 4 is a conceptual and schematic block diagram illustrating an example system 50 for extracting metal ions from metal-containing brines. System 50 includes a reactor vessel 52, a brine inlet 56, a brine outlet 58, a water inlet 62, a carbon dioxide inlet 66, and a metal carbonate solution outlet 70. System 50 may also include a brine source 58, a water source 64, a carbon dioxide source 68, a crystallizer 72, and/or a separator 74.

System 50 includes reactor vessel 52. Reactor vessel 52 may be configured to house porous particles 54 and receive brine containing metal ions to be extracted from the brine. In some examples, reactor vessel 52 may be configured as a batch reactor, while in other examples, reactor vessel 52 may be configured as a continuous, flow-through reactor. In some examples, reactor vessel 52 may be a single vessel, while in other examples, reactor vessel 52 may include multiple vessels coupled together or a single vessel with multiple compartments. For example, a first compartment may form a first stage of reactor vessel 52, such as an extraction stage of the metal ions from the brine, and a second compartment may form a second stage of the reaction vessel, such as pressurization and depressurization stage of carbon dioxide. In some examples, reactor vessel 52 may include temperature sensing and control equipment, such as heaters, coolers, temperature sensors, pressure sensors, flow meters, purge valves, outlet valves, or the like. For example, reactor vessel 52 may include heaters configured to heat a metal bicarbonate solution or other liquid in the reactor.

System 50 includes porous particles 54 in reactor vessel 52. Porous particles 54 comprise a metal ion imprinted material that includes a plurality of metal ion selective binding sites. Porous particles 54 may include a metal ion imprinted polymer and, optionally, an inorganic material, an inorganic metal ion sieve, or both. Porous particles 54 may be arranged and configured as a bed for fluid flow through the porous particles, such as a packed bed or a fixed bed. Porous particles 54 may have a variety of sizes and configurations, as discussed above. In some examples, porous particles 54 have a size selected to result in a selected pressure drop through the bed for a selected flow rate. In some examples, porous particles 54 are composites that includes inorganic metal ion sieve nanoparticles and metal ion imprinted polymer binder, as described in FIG. 1B.

System 50 may include multiple inlets and outlets for reactor vessel 52 including, for example, brine inlet 56, brine outlet 58, water inlet 62, carbon dioxide inlet 66, and metal carbonate solution outlet 70. Each of the inlets and outlets of reactor vessel 52 may include one or more control valves configured to control the flow of a respective fluid into and out of reactor vessel 52, one or more flow meters configured to measure the flow of a respective fluid into or out of reactor vessel 52, or the like. Each of the inlets and outlets into reactor vessel 52 may include a single inlet or outlet each, or multiple inlets or outlets each.

System 50 may include brine inlet 56. Brine inlet 56 may be fluidically coupled to reactor vessel 52 and brine source 58. Brine inlet 56 may be configured to introduce brine into reactor vessel 52 from brine source 58. Brine may include any solution containing a salt. Brine source 58 may store brine that includes a variety of metals and metal ions, including gold, silver, boron, barium, cesium, copper, lithium, potassium, manganese, lead, rubidium, tin, strontium, uranium, rare earth metals, and zinc. In some examples, brine source 58 may include a pump that pumps brine from an underground reservoir.

System 50 may also include brine outlet 60. Brine outlet 60 may be fluidically coupled to reactor vessel 52 and a brine discharge location (not shown). Brine outlet 60 may be configured to discharge brine from reactor vessel 52, such as to brine storage or another brine application. For example, brine from which particular metal ions have been extracted may be returned for use as a geothermal fluid or may be further processed for further metal ion extraction.

System 50 may include water inlet 62. Water inlet 62 may be fluidically coupled to reactor vessel 52 and water source 64. Water inlet 62 may be configured to introduce water into reactor vessel 52. In some examples, water inlet may include additional equipment, such as a sprayer, to distribute water into reactor vessel 52.

System 50 includes carbon dioxide inlet 66. Carbon dioxide inlet 66 may be fluidically coupled to reactor vessel 52 and carbon dioxide source 68. Carbon dioxide inlet 66 may be configured to receive carbon dioxide from carbon dioxide source 68 to pressurize reactor vessel 52 with carbon dioxide and depressurize reactor vessel 52. In some examples, carbon dioxide inlet may be configured to pressurize reactor vessel 52 to up to about 100 pounds per square in gauge (psig). In some examples, carbon dioxide inlet 66 may include additional equipment, such as a bubbler, to distribute the carbon dioxide in the water for faster dispersion.

System 50 includes metal carbonate solution outlet 70. Metal carbonate solution outlet 70 may be fluidically coupled to reactor vessel 52 and post-treatment equipment, such as crystallizer 72. Metal carbonate solution outlet 70 may be configured to discharge metal carbonate from reactor vessel 52. Metal carbonate solution outlet 70 may include additional equipment, such as buffer plates, that create turbulence. For example, metal carbonate may come out of solution after depressurization, so the metal carbonate suspension may be agitated to reduce fouling of metal carbonate solution outlet 70.

System 50 may optionally include post-treatment equipment for metal carbonate. In some examples, system 50 may include crystallizer 72. Crystallizer 72 may be coupled to metal carbonate solution outlet 70. Crystallizer 72 may be configured to crystallize metal carbonate to metal carbonate crystals. In some examples, system 50 may include separator 74 to separate any remaining liquid from the metal carbonate crystals. In some examples, a recycle stream may circulate liquid, such as liquid containing carbonic acid, from separator 74 back to reactor vessel 52 (not shown).

System 50 may include controller 76. Controller 76 may be configured to control system 50. For example, controller 76 may be configured to control components of system 50 to perform method 80 of FIG. 5 for extracting metal ion from metal ion containing brines, as will be described below. Controller 76 may be communicatively coupled to any of reactor vessel 52, brine inlet 56, bring outlet 60, water inlet 62, carbon dioxide inlet 66, and/or metal carbonate solution outlet 70. Controller 76 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, cloud computing clusters, and the like. Details regarding example operations performed by controller 76 will be described below with reference to FIG. 5.

Figure 5:
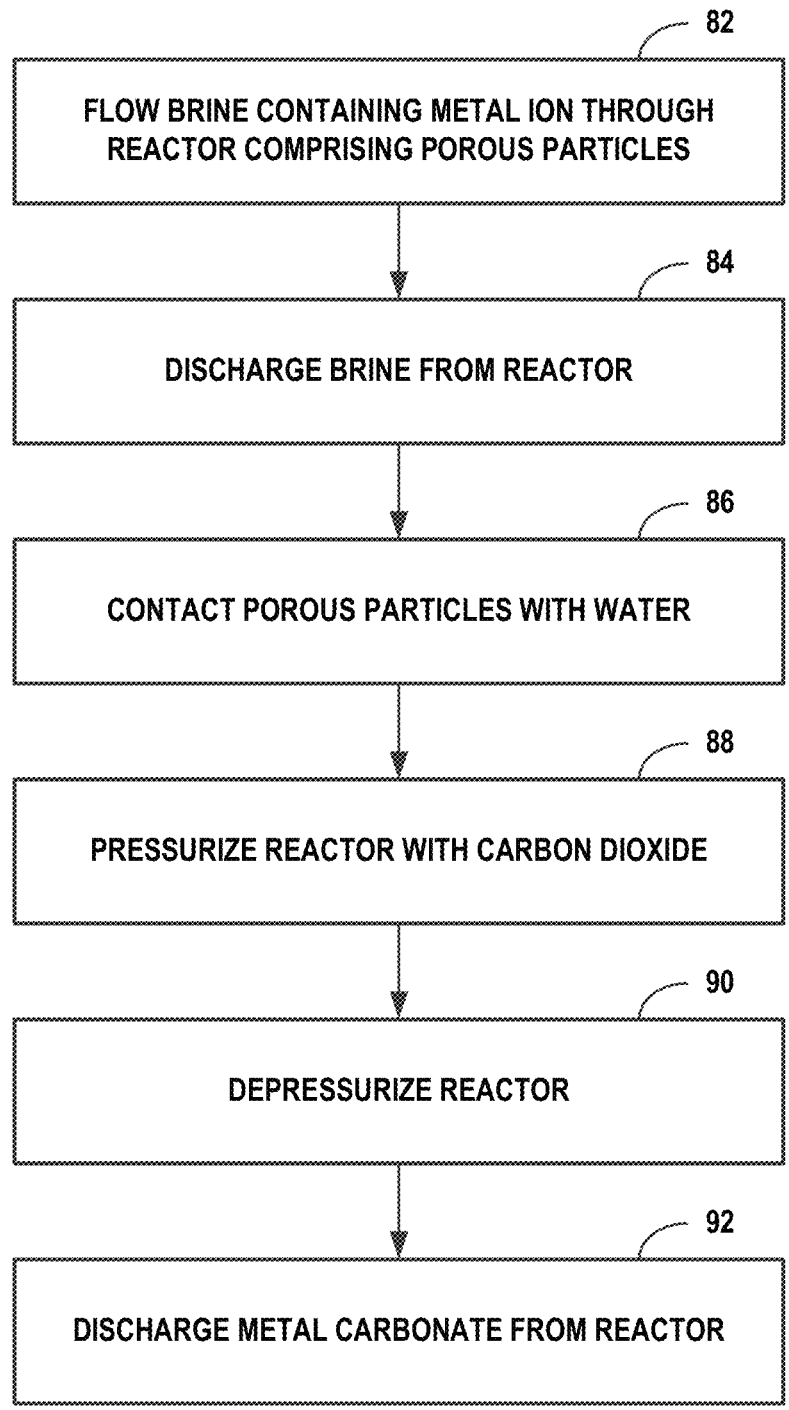
FIG. 5 is a flow diagram illustrating an example technique for extracting metal ions from metal-containing brines to produce metal carbonates.

The system of FIG. 4 may be used to extract metal ions from metal-containing brines and produce metal carbonates from the extracted metal ions. FIG. 5 is a flow diagram illustrating an example method for extracting metal ions from metal-containing brines. The technique of FIG. 5 will be described with concurrent reference to system 50 of FIG. 4, although one of ordinary skill will understand that the technique of FIG. 5 may be performed by other apparatuses that include more or fewer components, and that system 50 may perform other techniques.

The technique of FIG. 5 includes flowing brine containing a metal ion through reactor vessel 52 comprising porous particles 54 to remove target metal ions from the brine (82). For example, controller 76 may control brine inlet 56 and, optionally, brine source 58 or a pump between brine source 58 and brine inlet 56 to cause brine to flow through reactor vessel 52 (82). Brine may flow through brine inlet 56 into reactor vessel 52. Brine may flow through reactor vessel 52 and contact porous particles 54.

In examples in which the reactor is a batch reactor, flowing brine through the reactor (82) may include introducing brine into the reactor and allowing the brine to contact the porous particles for a particular residence time. For example, controller 76 may include a timer module configured to activate when a volume of brine enters reactor vessel 52. The residence time may depend on factors related to target metal ion uptake by the porous particles such as target metal ion concentration in the brine, volume of brine in reactor vessel 52, and the like. After the residence time has expired, controller 76 may control, for example, brine outlet 60 to discharge the volume of brine.

In examples where the reactor is a continuous reactor, flowing brine through the reactor (82) may include introducing brine into the reactor at a particular flow rate that corresponds to a desired residence time. For example, controller 76 may control brine inlet 56 for a selected flow rate of brine. The flow rate of brine may depend on factors related to target metal ion uptake by the porous particles and reactor vessel characteristics such as target metal ion concentration in the brine, diameter of reactor vessel 52, and the like.

Porous particles 54 include a metal ion imprinted polymer that includes a plurality of metal ion selective binding sites. For example, porous particles 54 may include the composite porous particles 20 described in FIG. 1B. The metal ions may adsorb into the porous particles and bind to the plurality of metal ion selective binding sites. In some examples, metal ions from the brine may bind to a chelating ligand of the metal ion imprinted polymer. For example, the metal ion may be a lithium ion in geothermal brine, the chelating ligand may be a β-diketone, and the lithium ion may bind to the β-diketone.

The technique of FIG. 5 includes discharging the brine from the reactor (84). For example, controller 76 may control brine outlet and, optionally, a brine discharge location to cause brine to flow from reactor vessel 52. In some examples, the brine may be discharged once porous particles 54 are saturated with metal ions or once the brine has spent a particular amount of time in the reactor. In some examples, residence time, concentration, and other brine flow and composition properties may be monitored to determine extent of adsorption of metal ions into porous particles 54. For example, controller 76 may monitor a residence time based on historical data, concentration discharge data, or other concentration monitoring system to determine the extent of target metal ion removal from the brine. Once a target metal ion removal has been reached, such as a residence time of brine in reactor vessel 52 or discharge target metal ion concentration minimum being exceeded, controller 76 may control brine outlet 60 to discharge spent brine. The spent brine may contain a lower concentration of the target metal ion and substantially similar concentrations for other metal ions not selected for extraction.

The technique of FIG. 5 includes contacting the porous particles in water (86) and pressurizing the reactor with carbon dioxide (88). For example, controller 76 may control carbon dioxide inlet 66 to cause reactor vessel 52 to pressurize. Pressurized carbon dioxide may flow into reactor vessel 52 and increase the pressure of reactor vessel 52 to a set point, such as between about 50 psig and about 100 psig. Contacting the porous particles may include submerging the porous particles, running water across a surface of the porous particles, or any other contact between the water and the porous particles. The pressurized carbon dioxide may migrate into the water and react with the water to form carbonic acid. The carbonic acid may replace the lithium ions with hydrogen, which liberates the lithium ion from the metal ion exchange material of the porous particle and thereby recharges the porous particle. The carbonic acid may further react with the adsorbed metal ions to form a metal bicarbonate solution. For example, the metal ion may be a lithium ion and the metal bicarbonate solution may be a lithium bicarbonate solution.

The technique of FIG. 5 may include depressurizing reactor vessel 52 (90) and heating the metal bicarbonate solution. For example, controller 76 may control carbon dioxide inlet 66, metal carbonate solution outlet 70, or another inlet or outlet of reactor vessel 52, to cause reactor vessel 52 to depressurize and/or control a heater of reactor vessel 52 to heat the lithium bicarbonate solution. As the reactor depressurizes and/or the metal bicarbonate solution heats, metal bicarbonate may convert to metal carbonate. In some examples, the metal carbonate solution may be heated to at least 60° C., such as 80° C. The concentration of metal carbonate in the solution may exceed the metal carbonate solubility, and metal carbonate may precipitate out of solution. Additionally, the pressure drop may cause a pH swing that provides a driving force to extract metal ions from the metal ion imprinted polymers and/or inorganic metal ion sieve nanoparticles of porous particles 54.

The technique of FIG. 5 includes discharging the metal carbonate from the reactor (92). For example, controller 76 may control metal carbonate solution outlet 70 and, optionally, crystallizer 72, to cause sodium carbonate to flow to crystallizer 72. In some examples, discharging the metal carbonate may be concurrent with depressurizing reactor vessel 52 (90). The metal carbonate may be present as a metal carbonate solution which may include any mixture that includes metal carbonate, including dissolved, suspended, or precipitated metal carbonate. The metal carbonate may be discharged for further post-treatment, such as crystallization or other separation processes.

The technique of FIG. 5 may optionally include post-treatment steps, such as crystallizing the metal carbonate (not shown) and/or separating the metal carbonate. For example, controller 76 may control one or more heaters in crystallizer 72 to initiate or increase a rate of crystallization of the metal carbonate. As another example, controller 76 may control a flow of effluent out of separator 74 to separate or dry metal carbonate crystals. In some examples, the metal carbonate may be lithium carbonate, and the lithium carbonate may be crystallized to from lithium carbonate crystals.

Figure 6:
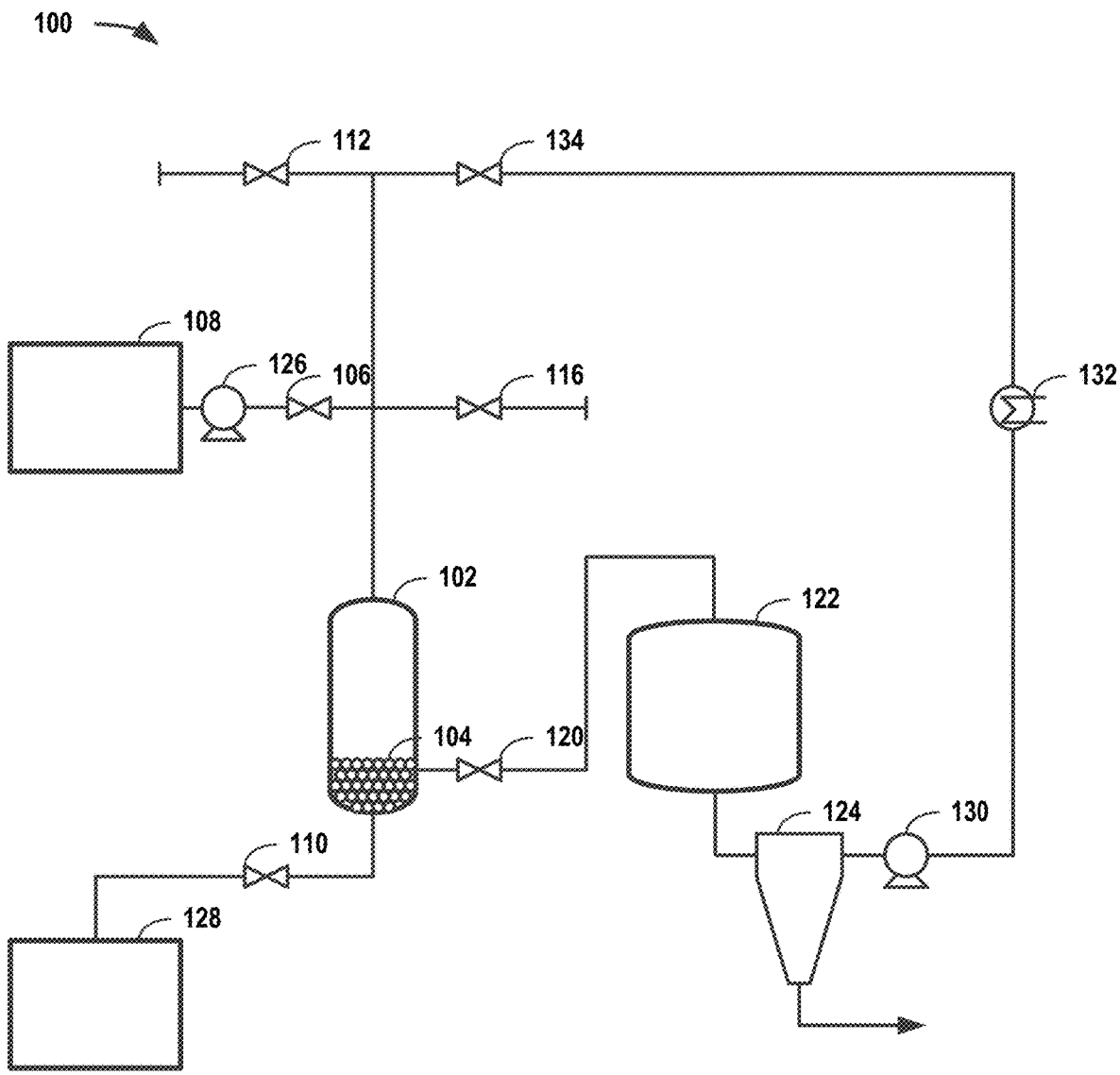
FIG. 6 is a conceptual process diagram illustrating an example system for extracting lithium from metal-containing brines to produce lithium carbonate.

In some examples, the technique of FIG. 5 may be used to extract lithium from geothermal brines to produce lithium carbonate. FIG. 6 is a conceptual process diagram illustrating an example system for extracting lithium from metal-containing brines. FIG. 6 may include components corresponding to similar components in FIG. 4. While FIG. 6 will be described with respect to lithium ions and lithium carbonate, the system of FIG. 6 may be used with a wide variety of metal ions to produce a variety of metal carbonates. While not shown, FIG. 6 may include a controller communicatively coupled to components of FIG. 6, such that the controller may control part or all of extraction of lithium ions and formation of lithium carbonate in accordance with the technique of FIG. 5.

Geothermal brine may be pumped from a brine storage tank 108 or reservoir by a brine pump 126. Brine may be introduced into a reactor vessel 102 through a brine inlet, in this instance brine inlet valve 106, at a particular flow rate. In some examples, the flow rate may correspond to a residence time of the brine in the reactor vessel, e.g., based on a relationship between a volume of reactor vessel 102 and a flow rate of the brine. The brine may contact composite porous particles 104 in reactor vessel 102. Composite porous particles may include lithium ion imprinted polymer, such as a lithium ion imprinted β-diketone, and inorganic lithium ion sieve nanoparticles, such as a hydrous manganese oxide, as described in FIG. 1B and FIG. 3. Lithium ions from the brine may migrate into the composite porous particles 104 and bind with binding sites of the lithium ion imprinted polymer and inorganic lithium ion sieve nanoparticles. Other metal ions in the brine, such as potassium and sodium, may not migrate into or bind with the binding sites due to the specific lithium ion selectivity of the binding sites. Once lithium ions have migrated into composite porous particles 104, a brine outlet, in this instance bring outlet valve 110, may discharge spent brine to a brine storage tank 128.

Water may be introduced to reactor vessel 102 through a water inlet, in this instance water inlet valve 112, from a water source (not shown), such as an industrial water treatment plant. The introduced water may contact composite porous particles 104. Carbon dioxide may be introduced to reactor vessel 102 through a carbon dioxide inlet, in this instance carbon dioxide inlet valve 116, to pressurize reactor vessel 102. Carbon dioxide may migrate into the water, creating carbonic acid in situ. Carbonic acid may react with lithium ions in composite porous particles 104 to form lithium bicarbonate in a lithium bicarbonate solution. Carbonic acid is not as corrosive as stronger acids such as HCl and may not damage the composite porous particles to the extent that stronger acids may. For example, HCl may cause manganese oxide to leach from the composite porous particles.

Reactor fluids, such as lithium bicarbonate solution, carbon dioxide, or the like, may be discharged through carbon dioxide inlet valve 116, a lithium carbonate outlet valve 120, or another inlet or outlet valve coupled to reactor vessel 102, to depressurize reactor vessel 102. The lithium bicarbonate concentration in the pressurized lithium bicarbonate solution may be higher than a solubility of lithium carbonate at depressurized conditions. The depressurization may convert lithium bicarbonate to lithium carbonate. Additionally, heaters in reactor vessel 102 may heat the lithium bicarbonate solution to facilitate conversion of lithium bicarbonate to lithium carbonate, such as to at least about 60° C. The concentration of lithium carbonate may exceed the solubility of lithium carbonate, and lithium carbonate may selectively precipitate out of solution. Other metal carbonate salts with higher solubility in water at the reactor conditions, such as potassium carbonate and sodium carbonate, may remain in solution. Additionally, the decrease in pressure may cause a pH swing that provides a driving force to pump the lithium out of the composite porous particles 104. The resulting liquid medium may include lithium carbonate precipitates in suspension.

Lithium carbonate suspension may be discharged from reactor vessel 102 through a metal carbonate solution outlet, in this instance lithium carbonate solution outlet valve 120, into crystallizer 122. Crystallizer 122 may crystallize lithium carbonate into lithium carbonate crystals, such as through addition of heat. During crystallization, other metal ions may remain in solution as lithium carbonate crystallizes. The lithium carbonate crystals may be transported to a separator 124 that separates liquid from the lithium carbonate crystals. The separated liquid may contain carbonic acid, which is more environmentally friendly and easier to dispose of than stronger acids, such as HCl. For example, lithium chloride formed by hydrochloric acid treatment may require additional processing steps to convert the lithium chloride to lithium carbonate, purify the lithium carbonate, and precipitate the lithium carbonate. Some carbonic acid solution may be pumped by recycle pump 130, heated by recycler heater 132, and reintroduced into reactor vessel 102 by recycle inlet valve 134, for example, to assist in recharging the porous particles.

Lithium carbonate crystals may be discharged from separator 124. The discharged lithium carbonate crystals may have a high purity. While lithium extracted by strong acids may require further processing steps to obtain lithium carbonate, the process described above directly produces lithium carbonate without removal of undesired metal ions or treatment with strong acids. Lithium carbonate is a primary component in high capacity batteries, including automotive batteries, power tool batteries, and the like.

Examples

Synthesis of Polymerizable Lithium Ligands 1-(vinyl phenyl) 4,4',4"-trifluoro-1,3-butanedione was prepared to support the preparation of lithium imprinted polymers. First, 4-vinylphenylacetophenone was prepared by the palladium-catalyzed reaction of 4-bromoacetophenone with 1,3,5,7-tetramethyl 1,3,5,7-tetravinyl cyclotetrasiloxane in the presence of tetrabutylammonium fluoride. Then, 4-vinylphenylacetophenone was condensed with ethyltrifluoroacetate to give 1-(p-vinyl phenyl) 4,4',4"-trifluoro-1,3-butanedione. FIG. 7A is a diagram of a reaction mechanism for synthesis of 1-(vinyl phenyl) 4,4',4"-trifluoro-1,3-butanedione.

Preparation of Lithium Imprinted Polymer Beads

Lithium imprinted polymers were prepared by inverse suspension polymerization of an organic phase consisting of a lithium polymerizable compound, a crosslinking agent (ethylene glycol dimethacrylate (EDGMA)), a porogen (dimethylsulfoxide (DMSO) or dimethylformamide (DMF)) and a radical initiator (AIBN) dispersed in a nonpolar solvent (mineral oil). Suspension of the organic monomers in mineral oil, rather than water, may help reduce the undesirable possible migration of lithium ions into the aqueous phase that may otherwise take place during conventional suspension polymerization.

As indicated in Table 1 below, a variety of lithiated polymerizable compounds were used, including lithium methacrylate in combination with tris(2-ethylhexyl)phosphate, 2-methacryloxyethylenephosphate, and vinylphosphonic acid, and lithium 1-(p-vinyl phenyl) 4,4',4"-trifluoro-1,3-butanedionate. The lithium diketonate was prepared immediately before use by reaction of lithium hydroxide and 1-(p-vinyl phenyl)-4,4',4"-trifluoro-1,3-butanedione at 50° C. for 2 hours. Polymerization was conducted at 80° C. under argon for about six hours after suspending the organic phase in the mineral oil by mechanical stirring.

TABLE 1

| Polymer | Monomers | Crosslinking Agent | Porogen | Surface Area (m²/g) |
|---|---|---|---|---|
| 39 | Lithium methacrylate (1 mmol)/2-methacryloxyethylphosphate (1 mmol) | EGDMA (8 mmol) | DMSO (5 mL) | n/d |
| 48 | Lithium methacrylate (1 mmol)/tris(2-ethylhexyl)phosphate (1 mmol) | EGDMA (8 mmol) | DMF (10 mL) | 265 |
| 2-1 2-33 | 1-(p-vinyl phenyl) 4,4',4"-trifluoro-1,3-butanedione (1 mmol)/2-methacryloxy ethylphosphate (1 mmol) | EGDMA (8 mmol) | DMSO (10 mL) | 2.4 |
| 2-25 | Lithium methacrylate (1 mmol)/vinylphosphonic acid (1 mmol) | EGDMA (5 mmol) | DMSO 5 mL) | 244 |

The lithiated polymers suspended in the mineral oil were isolated by filtration and repeatedly washed with chloroform and acetone. The isolated lithiated polymers were then transferred into a Soxhlet extractor and washed for over fifteen hours with a mixture of acetone and chloroform to extract any unreacted monomer. The lithiated polymers were then dried under vacuum at 70° C. for about 15 hours. A known amount of each lithiated polymer was then transferred in a flask and treated with 0.1 M HCl for 24 hours to remove the lithium from the lithiated polymer and form a lithium ion imprinted polymer. After filtering the lithium ion imprinted polymer, the resulting solution was tested by ICP-OES to determine its lithium concentration.

Figure 7B:
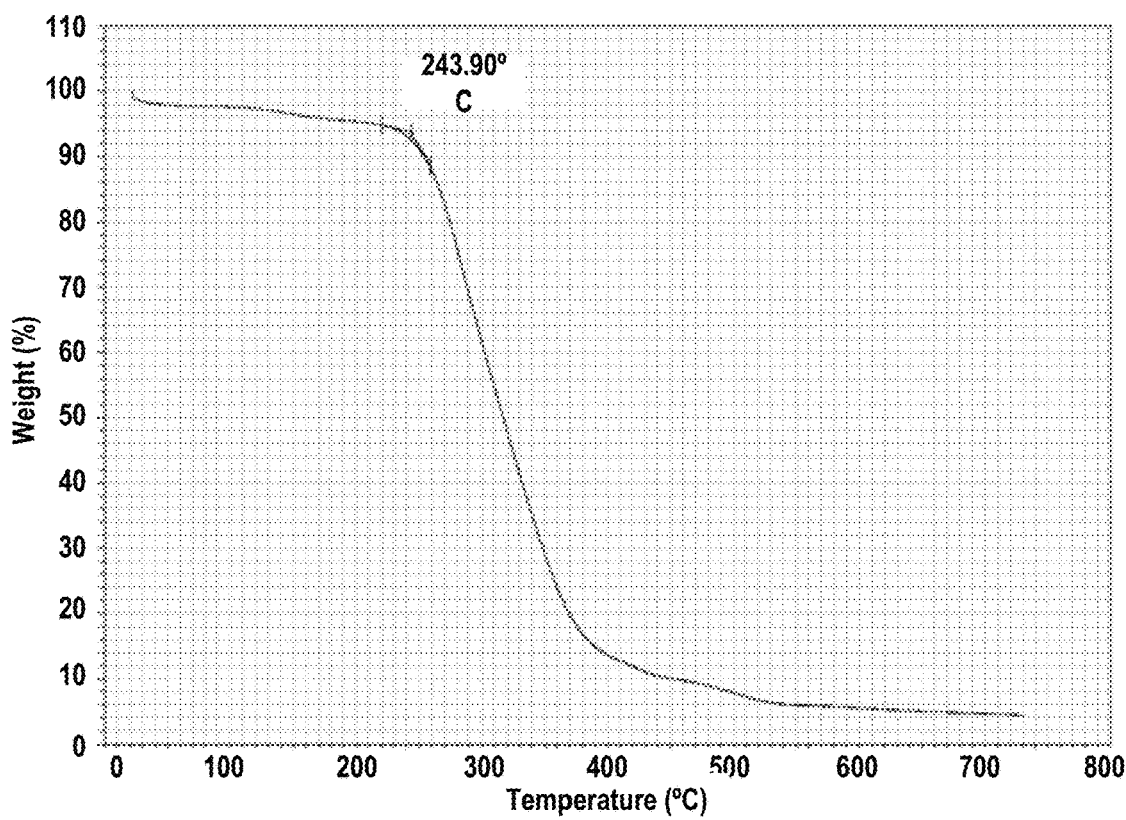
FIG. 7B is a graph of polymer weight loss as a function of the temperature and polymer onset of decomposition.

Thermogravimetric analysis of lithium-imprinted polymer 39 was performed by heating the polymer in air at a rate of 10° C./min. As indicated in FIG. 7B, the polymer weight loss is plotted as a function of the temperature and the polymer inset of decomposition is at 243.9° C.

Synthesis of Polymerizable Manganese Ligands

Figure 8A:
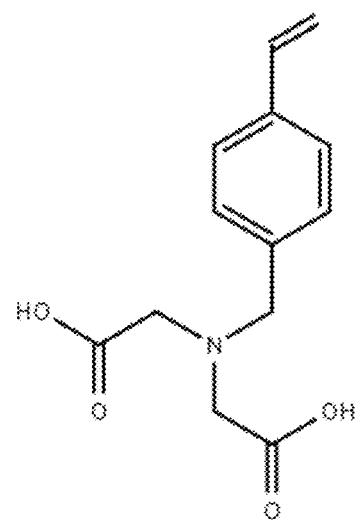
FIG. 8A is a diagram of N-(4-vinylbenzyl)imino diacetic acid.
Figure 8B:
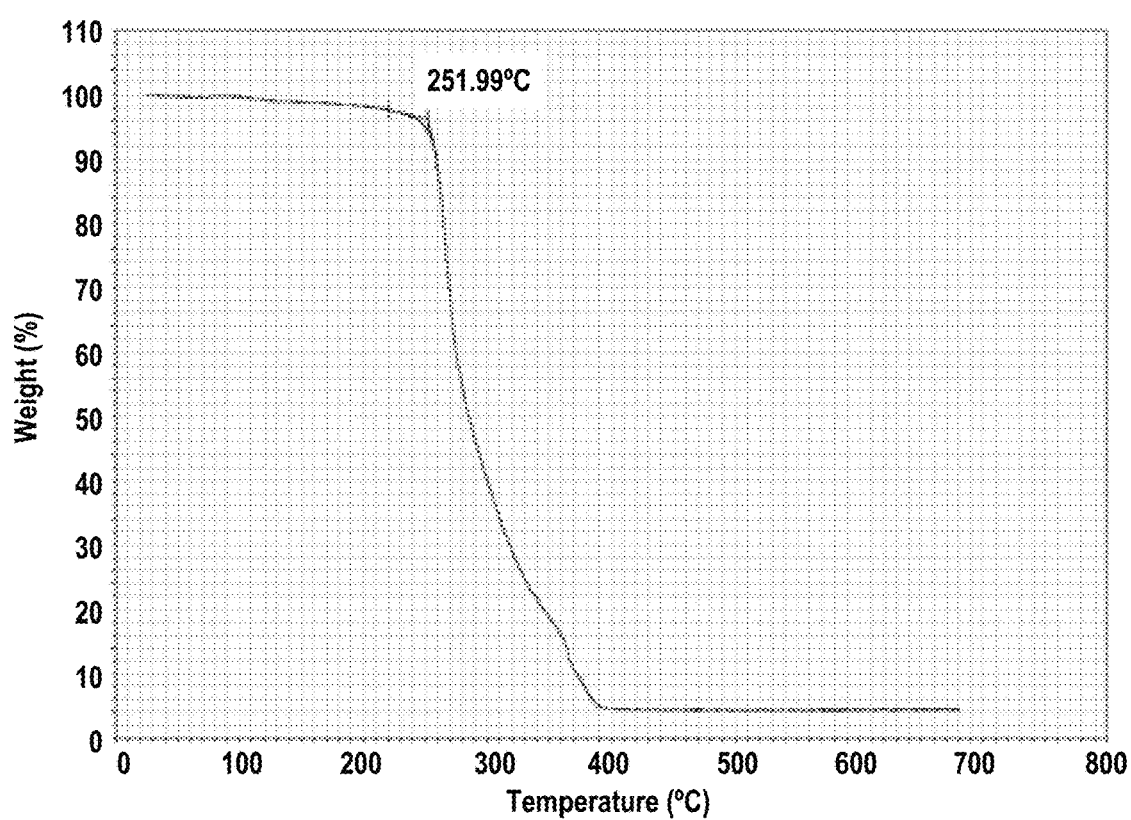
FIG. 8B is a graph of polymer weight loss as a function of the temperature and polymer onset of decomposition.

N-(4-vinylbenzyl)imino diacetic acid (VBIDA) was obtained as a manganese imprinted polymer. FIG. 8A shows a representation of N-(4-vinylbenzyl)imino diacetic acid. A thermogravimetric analysis of the manganese-imprinted polymer was performed by heating the polymer in air at a rate of 10° C./min. As indicated in FIG. 8B, the polymer weight loss is plotted as a function of the temperature and the polymer inset of decomposition is at 251.99° C.

Preparation of Manganese Imprinted Polymers Grafted on Silica

Manganese imprinted polymers grafted on silica particles were prepared. Silica particles act as solid support of the imprinted polymer and offer excellent mechanical stability to the resulting separation media. Silica particles (Silica-Flash G60, 60-200 micron) were chemically modified by reaction with 3-(trimethoxysily)propylmethacrylate to introduce methacrylate polymerizable groups on the silica particle surface. These methacrylate polymerizable groups may allow grafting of the manganese ion imprinted polymer directly on the silica particles. Furthermore, the binding capacity of the imprinted polymers grafted on silica can be adjusted by varying the silica particle size and surface area, as well on the weight ratio of monomers:silica. Smaller quantities of silica support are sufficient if the silica has smaller particle size and higher surface area.

A manganese ion imprinted polymer grafted on silica was prepared by reaction of 2-methacryloxy-ethylphosphate, an equivalent amount of $MnCl_2*4H_2O$, 8 mmol of EGDMA and 1 g of methacrylate-functionalized silica in dimethylformamide using AIBN as the radical initiator. The resulting silica-grafted manganese-containing polymer was then treated with excess 0.1 M HCl (aq) to remove the manganese ions bound into the polymer and generate the corresponding manganese ion imprinted polymer.

Batch Test of Metal Ion Imprinted Polymers

The metal binding capacities of the lithium ion imprinted polymer and manganese ion imprinted polymer were evaluated by performing batch adsorption tests at 45° C., corresponding to the exit temperature of the geothermal fluid in currently operating geothermal binary systems. Additional metal uptake tests at 75° C. and 100° C. were also performed.

A portion of the dried metal ion imprinted polymer (100-250 mg) was contacted with a buffer solution of known composition (5 or 10 mL) and gently shaken over a fixed period of time at the desired temperature. Polymer metal uptake was calculated by comparing the metal concentration in the initial solution ($C_i$) and the metal concentration in the solution after polymer treatment ($C_f$). The concentration of the metal ions in solution was determined by OES-ICP. Metal uptake was calculated according to the following equation:

$$\text{Metal Uptake} = V_{solution} \frac{C_i - C_f}{W_{polymer}}$$

where $W_{polymer}$ is the weight of the polymer used for the test, $V_{solution}$ is the volume of the solution contacted with the polymer, $C_i$ is the metal concentration in the initial solution, and $C_f$ is the metal concentration in the solution after polymer treatment. The metal uptake of the polymers was compared to their metal exchange capacity determined from the amount of lithium or manganese leached out after treating the polymers with 0.1 M HCl.

Lithium Ion Imprinted Polymers

FIG. 9 is a table of the monomers and their relative amounts used in the preparation of lithium imprinted polymers, as well as their metal exchange capacity (determined after the amount of metal leached out from the polymer treated with 0.1M HCl) and metal uptake from standard solutions. It should be noted that polymers 2-33 and 2-1 have the same composition and showed consistent performance.

Tables 2 and 3 show lithium uptake of lithium-imprinted polymer 1-2 as a function of pH and temperature at 45° C., 75° C. and 100° C. Buffers used in these tests are based on 0.1M $NH_4Cl/NH_3$ solutions.

Initial selectivity data of polymer 2-1 were evaluated by testing the polymer sorbent uptake in a 0.1M $NH_4Cl/NH_3$ buffer solution containing 412 ppm Li, 405 ppm of Na and 435 ppm of K at 45° C. and pH 9, as seen in Table 4.

TABLE 2

| Polymer | Li Uptake (mg/g) | Li Uptake (meq/g) | pH | Contact Time (hr) |
|---|---|---|---|---|
| 2-1 | 0.28 | 0.04 | 8 | 1 |
| 2-1 | 2.12 | 0.3 | 10 | 1 |
| 2-1 | 2.12 | 0.3 | 11 | 1 |

TABLE 3

| Polymer | Li Uptake (mg/g) | Li Uptake (meq/g) | Temp (° C.) | Contact Time (hr) |
|---|---|---|---|---|
| 2-1 | 2.1 | 0.30 | 45 | 0.5 |
| 2-1 | 2 | 0.29 | 75 | 0.5 |
| 2-1 | 1.6 | 0.23 | 100 | 0.5 |

TABLE 4

| Polymer | Li (ppm) | Na (ppm) | K (ppm) | Li Uptake (meq/g) | Na Uptake (meq/g) | K Uptake (meq/g) |
|---|---|---|---|---|---|---|
| 2-1 | 412 | 405 | 435 | 0.27 | 0.01 | 0.01 |

The following points may be observed from the data reported in FIG. 9 and Tables 2-4.

A lithium imprinted polymer prepared from lithium 1-(p-vinyl phenyl)-4,4',4''-trifluoro 1,3-butanedionate and 2-methacryloxyethylphosphonate with ethylene glycol dimethacrylate as crosslinking agent (Table 3, Polymer 2-1) showed the highest uptake of lithium ions at 45° C. Lithium uptake of 0.30 meq/g was measured when the polymer was contacted with 400 ppm of Li at pH 9 for thirty minutes. This is consistent with previous tests performed on the same polymer, as seen in FIG. 6A. Small variation on lithium uptake may be due to small pH variations. The lithium uptake did not change when the polymer was contacted for 30 min or longer periods of time (e.g., 2 and 3 hours).

Lithium ion imprinted polymer 2-1 was tested for lithium uptake from 0.1 M $NH_4Cl/NH_3$ aqueous buffer containing 400 ppm of Li at pH 8, 9, 10 and 11, showing comparable lithium uptake from pH 9 to 11, but lower uptake at pH 8, as seen in Table 2. Lithium ion imprinted polymer 2-1 was tested for lithium uptake from 0.1M $NH_4Cl/NH_3$ aqueous buffer containing 400 ppm of Li at pH 9 at 45° C., 75° C. and 100° C. The polymer showed comparable lithium uptake at 45° C. and 75° C., 0.3 meq/g and 0.29 meq/g. The lower lithium uptake at 100° C., 0.23 meq/g, may be due to lower lithium binding constant at high temperature. Lithium ion imprinted polymer 2-1 was tested for Li uptake from 0.1M $NH_4Cl/NH_3$ aqueous buffer containing 412 ppm of Li, 405 ppm Na and 435 ppm K at pH 9 and 45° C. Selective lithium uptake of 0.27 meq/g was demonstrated.

Manganese Imprinted Polymers

FIG. 10 is a table of the monomers and their relative amounts used in the preparation of manganese ion imprinted polymers, as well as their metal exchange capacity (determined after the amount of metal leached out from the polymer treated with 0.1M HCl) and metal uptake from standard solutions.

Table 5 shows manganese uptake of manganese imprinted polymer 2-11 at variable temperatures (45° C., 75° C. and 100° C.).

TABLE 5

| Polymer | Mn Uptake (mg/g) | Mn Uptake (meq/g) | Temp (° C.) | Contact Time (hr) |
|---|---|---|---|---|
| 2-11 | 11.85 | 0.22 | 45 | 0.5 |
| 2-11 | 12.1 | 0.22 | 75 | 0.5 |
| 2-11 | 13.25 | 0.24 | 100 | 0.5 |

The following points may be observed from the data reported in FIG. 10 and Table 5.

A manganese imprinted polymer grafted on silica particles (60-200 micron) prepared from manganese 2-methacryloxyethyl phosphonate and ethylene glycol dimethacrylate (Table 6, polymer 11) showed the highest Mn uptake of 0.24 meq/g from a standard solution of 500 ppm of Mn at 100° C., pH 4.65. The actual manganese uptake of the manganese imprinted polymer is 0.34 meq/g of active polymer if we take in account that that the hybrid sorbent contains 31% wt/wt of inert silica. The Mn uptake did not substantially change when the polymer was contacted for 30 min or longer periods of time (e.g., 2 and 3 hours).

Manganese uptake of polymer 2-11 from 500 ppm Mn in sodium acetate buffer solution at pH 4.65 showed a small increase from 45° C. to 100° C. The best binding capacity obtained for a lithium imprinted polymer is 0.3 meq/g, while the best binding capacity for the Mn-imprinted polymer is 0.34 meq/g, after discounting the silica support. Incremental adjustment of polymer composition and processing conditions are expected to yield polymers with the goal capacity.

Synthesis of Composite Material

Preparation of Nanopowder Lithium Manganese Oxide

The synthesis of Lithium Manganese Oxide (LMO) was carried out using a hydrothermal method performed in three steps. The first step involves the synthesis of $MnO_2$ nanoparticles by mixing analytical grade $Mn(NO_3)_2$, $4H_2O$ (0.083 mol), and $Na_2S_2O_8$ (0.083 mol) in 600 ml deionized water. The solution as stirred for 10 minutes, transferred into a 1 L stainless steel autoclave, and heated for 12 hours at 120° C. The resulting black solids were filtered, washed thoroughly with deionized water, and dried overnight at 100° C. Next, the Li—Mn—O precursor was synthesized using a wet-impregnation process. This wet-impregnation process involved mixing an aqueous solution of $LiNO_3$ (0.5M, Li/Mn mol ratio equal to 0.6) and the manganese oxide (MO) prepared in the first step. This mixture was then heated in the oven for 12 hours at 100° C. to remove water. This mixture was then calcined in a furnace at 450° C. for 6 hours to obtain lithium manganese oxide (LMO) nanoparticles.

Synthesis of Lithium Imprinted Polymer

Synthesis of 1-(p-Vinyl phenyl)-4,4',4"-trifluoro-1, 3-butanedione

A solution of 3-vinylacetophenone (2.0 g; 13.7 mmol) in 25 ml THF was added slowly over a period of 1 hour to a stirring suspension of sodium hydride (0.64 g; 15.5 mmol; 60% in mineral oil) and ethyl trifluoroacetate (2.0 g; 13.7 mmol) in thf (25 ml). The reaction mixture was stirred under argon overnight. The product was diluted with 100 ml ethyl ether and washed 3 times with 75 ml of 1M HCl. The organic phase was dried over $MgSO_4$. The solvent was then removed over rotavap to yield 4.0 g crude product. Column purification yielded 2.0 g of pure 1-(p-vinyl phenyl)-4,4',4"-trifluoro-1,3-butanedione.

Synthesis of the Composite Material

The lithium complex of 1-(p-vinyl phenyl)-4,4',4"-trifluoro-1,3-butanedione was prepared by treating lithium hydroxide with the diketone. 1.0 g, 4 mmol of 1-(p-vinyl phenyl)-4,4',4"-trifluoro-1,3-butanedione was dissolved in 75 ml acetone in a 100 ml round bottom flask. Solid lithium hydroxide monohydrate, 0.2 g; 4.4 mmol was added and refluxed for 2 hours. Acetone was removed using rotavap and any residual solvent was removed under vacuum. Separately, in a 100 ml round bottom flask, dimethylsulfoxide ("DMSO"; 30 ml) was degassed with nitrogen and ethyleneglycol dimethacrylate (EGDMA; 4.8 g; 24 mmol; 1:6 ratio of diketone and EGDMA) was added to the DMSO. 4 mmol, 0.52 g hydroxyehylmethacrylate (HEMA) was added to the DMSO and EGDMA mixture. 200 ml mineral oil and 20 ml tris(2-ethylhexyl)phosphate were added to a 1 L glass reactor equipped with overheard stirrer and nitrogen was bubbled for about 1 hour to remove oxygen. The DMSO mixture was transferred into the flask containing the lithium complex using a canula. With stirring, 6.5 g of the nano powder, LMO, and azo-bis isobutyronitrile (AIBN) (0.1 g) was added to the flask. The polymerization process was performed under nitrogen. Using a larger diameter canula, the mixture of monomers and LMO was transferred to the glass reactor with mineral oil and tris(2-ethylhexyl)phosphate with vigorous stirring. The polymerizable mixture was slowly heated to 75° C. Polymerization over a period of 3-5 h lead to formation of composite beads which were washed filtered and washed with 300 ml of 1:1 mixture of acetone and chloroform. Soxhlet extraction of beads in an acetone/chloroform mixture removed the residual oil resulting in 12 g of polymer composite. Lithium ions were extracted from the composite in 0.5M HCl and washed with water to obtained the composite ion sieve in the $H^+$ form.

Figure 11:
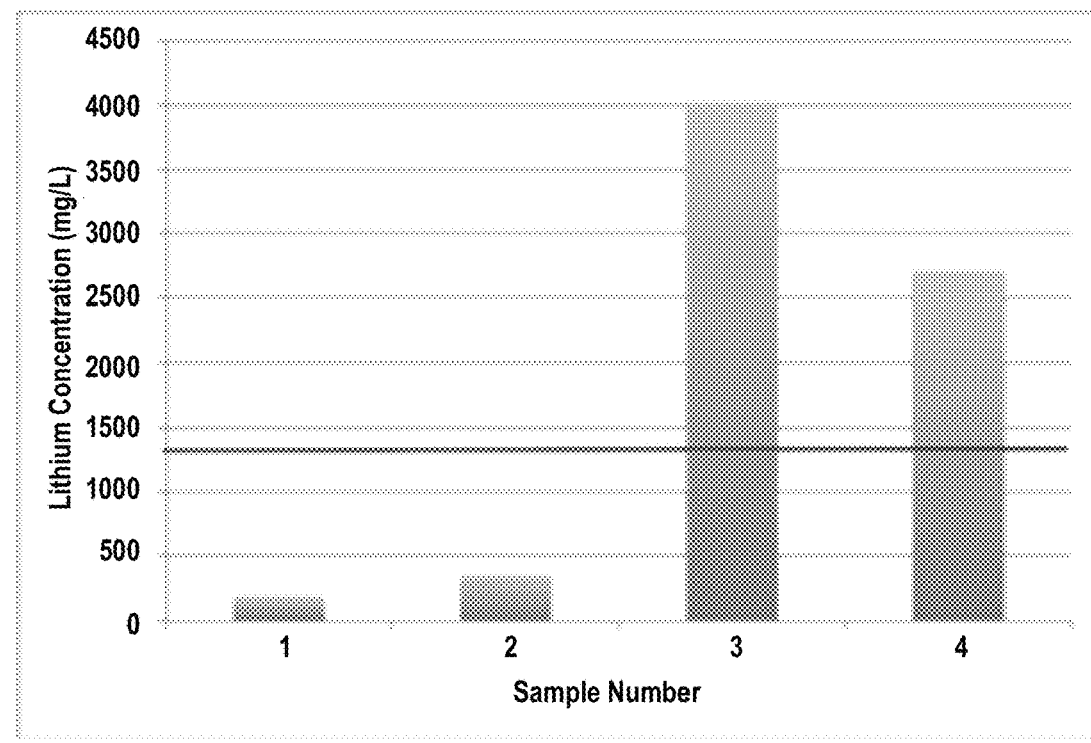
FIG. 11 is a graph of lithium uptake for various samples of composite porous particles of lithium ion selective polymer and inorganic lithium ion sieve materials.

A sample of lithium-saturated polymer or HMO material was placed in a small vessel, covered with water, and then pressurized with $CO_2$. After releasing the pressure, the solution was analyzed for lithium and manganese. Depending on the sample and conditions, up to 4000 mg/L of lithium was measured in the solution, with no detectable manganese (20 mg/L detection limit), as seen in FIG. 11.

In some examples, a material includes a porous particle that includes a metal ion imprinted polymer formed from a metal containing polymerizable compound that includes at least one metal chelating ligand and a cross-linking agent, wherein the metal ion imprinted polymer comprises a plurality of metal ion selective binding sites.

In some examples, the porous particle further includes an inorganic metal ion sieve.

In some examples, the porous particle is a composite that includes nanoparticles comprising the inorganic metal ion sieve and binder comprising the metal ion imprinted polymer.

In some examples, the inorganic metal ion sieve is one of hydrous manganese oxide, ferrous manganese oxide, aluminum hydroxide, and titanium hydroxide, and the metal ion imprinted polymer is a β-diketone.

In some examples, the porous particle includes a core comprising silica and a shell comprising the metal ion imprinted polymer.

In some examples, the metal ion is lithium and the plurality of metal ion selective binding sites is a plurality of lithium ion selective binding sites.

In some examples, the porous particle is a bead or needle-like particle.

In some examples, the porous particle has a diameter greater than about 100 μm and less than about 1000 μm.

In some examples, the porous particle has a surface area per unit mass of greater than about 10 $m^2$/g.

In some examples, the metal ion imprinted polymer includes at least one β-diketone corresponding to the metal ion selective binding sites.

In some examples, the metal ion imprinted polymer is further formed from a polar monomer.

In some examples, a method includes suspending an organic phase in a nonpolar solvent to form a prepolymer mixture, wherein the organic phase includes: a monomer premix that includes a metal containing polymerizable compound that includes at least one metal chelating ligand and a cross-linking agent; a porogen; and an initiator. The method further includes heating the prepolymer mixture to initiate polymerization of the monomer premix and form a metal containing polymer, separating the metal containing polymer from the prepolymer mixture, and applying an aqueous acid to the metal containing polymer to form a metal ion imprinted polymer.

In some examples, the prepolymer mixture further includes an inorganic metal ion sieve.

In some examples, the inorganic metal ion sieve is hydrous manganese oxide.

In some examples, the prepolymer mixture includes functionalized silica.

In some examples, the monomer premix further comprises a polar monomer.

In some examples, the metal containing polymerizable compound comprises a lithiated polymerizable compound and the metal ion imprinted polymer comprises a lithium ion imprinted polymer.

In some examples, the metal containing polymerizable compound comprises a metal containing β-diketone that includes a saturated functional group.

In some examples, the metal containing polymerizable compound comprises a β-diketone, the hydrophilic co-monomer comprises 2-hydroxyethylmethacrylate, and the crosslinking agent comprises ethylene glycol.

In some examples, a system includes a packed bed reactor that includes: a reactor vessel; a brine inlet through which brine is introduced into the reactor vessel; a brine outlet through which brine is discharged from the reactor vessel; a water inlet through which water is introduced into the reactor vessel; a carbon dioxide inlet configured to receive carbon dioxide from a carbon dioxide source to pressurize the reactor vessel with carbon dioxide and depressurize the reactor vessel; a metal carbonate solution outlet through which metal carbonate is discharged from the reactor vessel; and porous particles in the reactor vessel. The porous particles include a metal ion imprinted polymer formed from a cross-linking agent and a metal containing polymerizable compound that includes at least one metal chelating ligand, wherein the metal ion imprinted polymer comprises a plurality of metal ion selective binding sites.

In some examples, the metal ion imprinted polymer includes a lithium ion imprinted polymer.

In some examples, the system further includes a crystallizer configured to crystallize the lithium carbonate.

In some examples, the metal ion imprinted polymer includes at least one β-diketone corresponding to the metal ion selective binding sites.

In some examples, a method includes flowing brine containing a metal ion through a packed bed reactor comprising porous particles to remove metal ions from the brine, wherein the porous particles comprise a metal ion imprinted polymer formed from a cross-linking agent and a metal containing polymerizable compound that includes at least one metal chelating ligand, wherein the metal ion imprinted polymer comprises a plurality of metal ion selective binding sites. The method further includes discharging the brine from the reactor; contacting the porous particles in water; pressurizing the reactor with carbon dioxide, wherein the carbon dioxide reacts with the adsorbed metal ions to form a metal carbonate solution; depressurizing the reactor to precipitate metal carbonate from the metal carbonate solution; and discharging the metal carbonate solution from the reactor.

In some examples, the metal ion is lithium and the metal carbonate is lithium carbonate.

In some examples, the method further includes crystallizing the lithium carbonate.

In some examples, the metal ion imprinted polymer includes at least one β-diketone corresponding to the metal ion selective binding sites.

Various examples have been described. These and other examples are within the scope of the following claims.

What is claimed is:

1. A material comprising:
    a composite porous particle comprising:
        porous nanoparticles comprising an inorganic metal ion sieve; and
        a binder comprising a metal ion imprinted polymer formed from:
            a hydrophilic co-monomer;
            a metal containing polymerizable compound that includes at least one metal chelating ligand, wherein the at least one metal chelating ligand is configured to form two or more coordinate bonds with a metal ion; and
            a cross-linking agent;
        wherein the metal ion imprinted polymer comprises a plurality of metal ion selective binding sites formed from the at least one metal chelating ligand, and
        wherein the inorganic metal ion sieve comprises a plurality of metal ion selective binding sites.

2. The material of claim 1, wherein the inorganic metal ion sieve is one of hydrous manganese oxide, ferrous manganese oxide, aluminum hydroxide, and titanium hydroxide, and the metal chelating ligand in the metal ion imprinted polymer is a β-diketone.

3. The material of claim 1, wherein the metal ion is lithium and the pluralities of metal ion selective binding sites comprises a plurality of lithium ion selective binding sites.

4. The material of claim 1, wherein the composite porous particle has a diameter greater than about 100 μm and less than about 3 mm.

5. The material of claim 1, wherein the composite porous particle has a surface area per unit mass of greater than about 10 $m^2/g$.

6. The material of claim 1, wherein the metal ion imprinted polymer includes at least one β-diketone corresponding to the metal ion selective binding sites of the metal ion imprinted polymer.

7. The material of claim 1, wherein the porous nanoparticles are dispersed in the metal ion imprinted polymer to form a dispersed phase of porous nanoparticles in a continuous phase of the metal ion imprinted polymer.

8. The material of claim 1,
    wherein the plurality of metal ion selective binding sites of the metal ion imprinted polymer is selective to the metal ion of the metal ion imprinted polymer,
    wherein the porous nanoparticles are formed from metal containing inorganic sorbent nanoparticles, and
    wherein the plurality of metal ion selective binding sites of the inorganic metal ion sieve is selective to a metal ion of the metal containing inorganic sorbent nanoparticles.

9. A system comprising:
    a reactor comprising:
        a reactor vessel;
        a brine inlet through which brine is introduced into the reactor vessel;
        a brine outlet through which brine is discharged from the reactor vessel;
        a water inlet through which water is introduced into the reactor vessel;
        a carbon dioxide inlet configured to receive carbon dioxide from a carbon dioxide source, the carbon dioxide used to pressurize the reactor vessel and depressurize the reactor vessel;
        a metal carbonate solution outlet through which metal carbonate is discharged from the reactor vessel; and
    composite porous particles in the reactor vessel, wherein the composite porous particles comprise:
        porous nanoparticles comprising an inorganic metal ion sieve; and
        a binder comprising a metal ion imprinted polymer formed from a hydrophilic co-monomer, a cross-linking agent and a metal containing polymerizable compound that includes at least one metal chelating ligand, wherein the at least one metal chelating ligand is configured to form two or more coordinate bonds with a metal ion,
        wherein the metal ion imprinted polymer comprises a plurality of metal ion selective binding sites formed from the at least one metal chelating ligand, and
        wherein the inorganic metal ion sieve comprises a plurality of metal ion selective binding sites.

10. The system of claim 9, wherein the metal ion imprinted polymer comprises a lithium ion imprinted polymer.

11. The system of claim 9, further comprising a crystallizer configured to crystallize the lithium carbonate.

12. The system of claim 9, wherein the metal ion imprinted polymer includes at least one β-diketone corresponding to the metal ion selective binding sites of the metal ion imprinted polymer.

13. A method comprising:
flowing brine containing a metal ion through a reactor comprising composite porous particles to remove metal ions from the brine, wherein the composite porous particles comprise:
porous nanoparticles comprising an inorganic metal ion sieve; and
a binder comprising a metal ion imprinted polymer formed from a hydrophilic co-monomer, cross-linking agent and a metal containing polymerizable compound that includes at least one metal chelating ligand, wherein the at least one metal chelating ligand is configured to form two or more coordinate bonds with a metal ion,
wherein the metal ion imprinted polymer comprises a plurality of metal ion selective binding sites formed from the at least one metal chelating ligand, and
wherein the inorganic metal ion sieve comprises a plurality of metal ion selective binding sites;
discharging the brine from the reactor;
contacting the composite porous particles with water;
pressurizing the reactor with carbon dioxide, wherein the carbon dioxide reacts with the adsorbed metal ions to form a metal carbonate solution;
depressurizing the reactor to precipitate metal carbonate from the metal carbonate solution; and
discharging the metal carbonate solution from the reactor.

14. The method of claim 13, wherein the metal ion is lithium and the metal carbonate is lithium carbonate.

15. The method of claim 14, further comprising crystallizing the lithium carbonate.

16. The method of claim 15, wherein the metal ion imprinted polymer includes at least one β-diketone corresponding to the metal ion selective binding sites of the metal ion imprinted polymer.

* * * * *